United States Patent
Huang

(10) Patent No.: US 11,310,177 B2
(45) Date of Patent: Apr. 19, 2022

(54) MESSAGE DISPLAY METHOD AND TERMINAL

(71) Applicant: Huawei Technologies Co., Ltd., Shenzhen (CN)

(72) Inventor: Yan Huang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/260,910

(22) PCT Filed: Jul. 18, 2018

(86) PCT No.: PCT/CN2018/096151
§ 371 (c)(1),
(2) Date: Jan. 15, 2021

(87) PCT Pub. No.: WO2020/014900
PCT Pub. Date: Jan. 23, 2020

(65) Prior Publication Data
US 2021/0266273 A1 Aug. 26, 2021

(51) Int. Cl.
*G06F 15/16* (2006.01)
*H04L 51/04* (2022.01)
*G06F 3/14* (2006.01)

(52) U.S. Cl.
CPC .......... *H04L 51/04* (2013.01); *G06F 3/14* (2013.01)

(58) Field of Classification Search
USPC ........................................... 709/206
See application file for complete search history.

(56) References Cited

U.S. PATENT DOCUMENTS

| 11,153,235 | B1* | 10/2021 | Dalonzo ............... H04L 51/04 |
| 2006/0031362 | A1 | 2/2006 | Chacko et al. |

(Continued)

FOREIGN PATENT DOCUMENTS

| CN | 1716919 A | 1/2006 |
| CN | 102932232 A | 2/2013 |

(Continued)

OTHER PUBLICATIONS

3GPP TS 23.226, V15 0.0, "3rd Generation Partnership Project; Technical Specification Group Services and System Aspects; Global Text Telephony (GTT); Stage 2 (Release 15)," Jun. 2018, 28 pages.

(Continued)

*Primary Examiner* — Anthony Mejia
(74) *Attorney, Agent, or Firm* — Conley Rose, P.C.

(57) ABSTRACT

A message display method includes displaying, by a first terminal, a chat window for chatting with a second terminal, receiving, by the first terminal at a first moment, an initial character of a first message from a user into the input box, receiving, by the first terminal at a second moment, an initial character of a second message from the second terminal, receiving, by the first terminal at a third moment, a first preset character from the user into the input box, wherein the first preset character indicates that the first message is complete, and the third moment is later than the second moment, and displaying, by the first terminal in the dialog area, the first message as a message earlier than the second message.

20 Claims, 16 Drawing Sheets

(56) References Cited

U.S. PATENT DOCUMENTS

| | | |
|---|---|---|
| 2006/0256012 A1 | 11/2006 | Fok et al. |
| 2014/0006533 A1 | 1/2014 | Zuo et al. |
| 2014/0240440 A1 | 8/2014 | Seo et al. |
| 2015/0281143 A1 | 10/2015 | Wang |
| 2015/0312735 A1 | 10/2015 | Gaillard et al. |
| 2017/0126596 A1 | 5/2017 | Sercantaha |
| 2019/0020607 A1* | 1/2019 | Chiang .............. H04W 4/12 |
| 2019/0044985 A1* | 2/2019 | Jo .............. H04L 65/4053 |
| 2019/0095422 A1* | 3/2019 | Chiang .............. G06F 40/114 |

FOREIGN PATENT DOCUMENTS

| | | |
|---|---|---|
| CN | 103457835 A | 12/2013 |
| CN | 103873341 A | 6/2014 |
| CN | 104506330 A | 4/2015 |
| CN | 104854824 A | 8/2015 |
| CN | 105187290 A | 12/2015 |
| CN | 105391620 A | 3/2016 |
| CN | 105681160 A | 6/2016 |
| CN | 106506323 A | 3/2017 |
| CN | 106791052 A | 5/2017 |
| CN | 107193818 A | 9/2017 |
| CN | 107547353 A | 1/2018 |
| CN | 108111396 A | 6/2018 |
| EP | 2926510 B1 | 10/2016 |
| WO | 2001093510 A1 | 12/2001 |

OTHER PUBLICATIONS

3GPP TS 26.114, V15.3.0, "3rd Generation Partnership Project; Technical Specification Group Services and System Aspects; IP Multimedia Subsystem (IMS); Multimedia Telephony; Media handling and interaction (Release 15)," Jun. 2018, 399 pages.

ITU-T Recommendation T.140, "Series T: Terminals for Telematic Services,Protocol for multimedia application text conversation," Feb. 1998, 17 pages.

\* cited by examiner

MESSAGE DISPLAY METHOD AND TERMINAL

CROSS-REFERENCE TO RELATED APPLICATIONS

This application is a U.S. National Stage of International Patent Application No. PCT/CN2018/096151 filed on Jul. 18, 2018, which is hereby incorporated by reference in its entirety.

TECHNICAL FIELD

This application relates to the terminal field, and in particular, to a message display method and a terminal.

BACKGROUND

In a chat scenario, an RTT (real time text, real-time text) technology enables a user to view a message entered by a sender in real time. To be specific, when a terminal of a user A is receiving a message sent from a terminal of a user B, each character entered by the user B on the terminal of the user B can be displayed on the terminal of the user A in real time. The user A can view specific content of the message on the terminal of the user A, with no need to wait for the user B to enter the complete message and tap a send key.

For example, as shown in FIG. 1(a) to FIG. 1(c), the terminal of the user A is on the left, and the terminal of the user B is on the right. The two users may send messages to each other by using a same chat application. For example, the user B wants to enter a complete message 1 "hello, nice to meet you". As shown in FIG. 1(a), in a process in which the user B enters "hello, nice to" in an input box 101, each character entered by the user B can be displayed on the terminal of the user A in real time. Before the user B enters the complete message 1, if the terminal of the user A sends a message 2 "Oh" entered by the user A, as shown in FIG. 1(b), the message 2 is displayed after the message 1 on the terminal of the user A. However, because the user B has not completed entering of the message 1, only the message 2 sent by the user A is displayed in a dialog area 102 displayed on the terminal of the user B. After the user B enters the complete message 1 and taps a send key 103, as shown in FIG. 1(c), the terminal of the user B displays, based on a time point at which the user B taps the send key 103, the message 1 after the message 2 that is sent by the user A.

That is, for a received message (for example, the message 1 on the terminal of the user A) of a terminal, the terminal uses a receiving time of an initial character in the message 1 as a receiving time of the message 1; for a sent message (for example, the message 1 on the terminal of the user B) of a terminal, the terminal uses, as a sending time of the message 1, a time point at which the user taps the send key after entering the message 1. Therefore, the terminals each may display each message in a message box according to a sequence of a receiving time and a sending time. In this case, a same message (for example, the foregoing message 1) is displayed in different sequential positions on the terminals of the user A and the user B. Consequently, a time sequence relationship in a chat process cannot be effectively reflected, and input efficiency of a user during the chat is affected.

SUMMARY

This application provides a message display method and a terminal, so that a plurality of messages can be displayed on the terminal in a real time sequence, thereby improving input efficiency and use experience of a user when the user uses the terminal to chat.

To achieve the foregoing objective, the following technical solutions are used in this application:

According to a first aspect, this application provides a message display method, including: A first terminal displays a chat window for chatting with a second terminal, where the chat window includes an input box and a dialog area. The first terminal receives, at a first moment, an initial character that is of a first message (the first message comprises X characters, and X is an integer greater than 0) and that is entered by a user into the input box. In other words, an input time of the initial character in the first message is the first moment. In addition, the first terminal may send, to the second terminal in real time from the first moment, a character entered by the user into the input box. Subsequently, the first terminal receives, at a second moment (the second moment is later than the first moment), an initial character that is of a second message (the second moment is later than the first moment, the second message comprises Y characters, and Y is an integer greater than 0) and that is sent by the second terminal. In other words, a receiving time of the initial character in the second message is the second moment. Further, the first terminal receives, at a third moment (the third moment is later than the second moment), a first preset character (for example, a line feed character) entered by the user into the input box, where the first preset character is used to indicate that the first message sent this time is complete.

In the foregoing processes of sending the first message and receiving the second message, because the first moment is earlier than the second moment, it indicates that a time point at which the user of the first terminal initiates the chat is earlier than a time point at which a user of the second terminal initiates the chat. Therefore, when the first terminal displays the first message and the second message in the dialog area, the first message may be displayed as a message earlier than the second message. In this way, messages displayed by the first terminal in the dialog area are arranged according to time points at which the users initiate the chat, and a time sequence relationship between the messages is in order. Therefore, a plurality of messages are displayed on a terminal in a correct time sequence, thereby improving input efficiency and use experience of a user when the user uses the terminal to chat.

In a possible design method, a sending time of the first message is the first moment (that is, the input time of the initial character in the first message), and a receiving time of the second message is the second moment (that is, the receiving time of the initial character in the second message).

In a possible design method, the first terminal may further receive, between the first moment and the third moment, X-1 characters, other than the initial character, in the first message that are entered by the user into the input box. In this case, that the first terminal displays the first message in the dialog area specifically includes: the first terminal synchronously displays, each time one of the X characters is displayed in the input box, the character in a first message box in the dialog area. In this way, in a process in which the user enters, into the input box, the first message sent to the second terminal this time, the user can view the synchronously displayed first message in the dialog area in real time.

In a possible design method, after the first terminal receives, at the third moment, the first preset character entered by the user into the input box, because the first preset character is used to indicate that the first message entered by the user into the input box this time is complete, the first terminal may clear all characters in the input box in response to the input of the preset character. Subsequently, when detecting that the user enters a new character into the input box, the first terminal may use the character as an initial character in a next sent message.

In a possible design method, after the receiving, by the first terminal at a second moment, an initial character that is of a second message and that is sent by the second terminal, the method further includes: receiving, by the first terminal at a fourth moment, a second preset character sent by the second terminal, where the second preset character is used to indicate that the second message sent by the second terminal this time is complete. Subsequently, if the first terminal receives a new character sent by the second terminal, the first terminal may use the new character as an initial character in a next received message.

In a possible design method, the first terminal may further receive, between the second moment and the fourth moment, Y-1 characters, other than the initial character, in the second message that are sent by the second terminal. In this case, that the first terminal displays the second message in the dialog area specifically includes: the first terminal synchronously displays, each time the first terminal receives one of the Y characters, the character in a second message box in the dialog area. In other words, before the first terminal receives the second preset character used to indicate that the second message is complete, the first terminal may synchronously display, in the dialog area, the second message sent by the second terminal.

In a possible design method, the first terminal may display the second message as a latest message in the dialog area between the second moment and the fourth moment, and the first terminal may further display a prompt indicating that the second message is being entered. To be specific, before the first terminal receives the second preset character used to indicate that the second message is complete, because the second message sent by the other party is not complete, and the user focuses on specific content of the second message, the first terminal may display the second message that is being entered as a current latest message. This prevents the second message from being overwhelmed by another message whose sending time is later than the receiving time of the initial character in the second message.

For example, if the first terminal receives, between the second moment and the fourth moment, an initial character in a third message (the third message includes Z characters, and Z is an integer greater than 0) entered by the user into the input box, the first terminal may display, in the dialog area, the third message as a message earlier than the second message, that is, the latest message is still the second message at this time.

In a possible design method, after the first terminal receives, at the fourth moment, the second preset character sent by the second terminal, it indicates that the second message sent by the second terminal this time is complete. In this case, the first terminal may rearrange, in the dialog area, a display order of the third message and the second message based on the receiving time of the initial character in the second message and an input time of the initial character in the third message, where after the update, the third message is displayed as a message later than the second message. In this way, an actual time sequence relationship between chat messages in the dialog area is restored.

For example, when displaying the first message and the second message in the dialog area, the first terminal may further display the sending time of the first message and the receiving time of the second message in the dialog area.

According to a second aspect, this application provides a message display method, including: A first terminal displays a chat window for chatting with a second terminal, where the chat window includes a dialog area. The first terminal receives, at a first moment, an initial character that is of a first message (the first message comprises Y characters, and Y is an integer greater than 0) and that is sent by the second terminal. Subsequently, the first terminal may receive Y-1 characters, other than the initial character, in the first message that are sent by the second terminal. Each time the first terminal receives one of the Y characters, because the first message sent by the other party is not complete, and a user focuses on specific content of the first message, the first terminal may display the first message that is being entered as a current latest message. This prevents the first message from being overwhelmed by another message whose sending time is later than a receiving time of the initial character in the first message.

In a possible design method, after the receiving, by the first terminal, Y-1 characters in the first message that are sent by the second terminal, the method further includes: receiving, by the first terminal at a second moment (the second moment is later than the first moment), a preset character sent by the second terminal, where the preset character is used to indicate that the first message sent by the second terminal this time is complete. Subsequently, if the first terminal receives a new character sent by the second terminal, the first terminal may use the new character as an initial character in a next received message.

In a possible design method, if the first terminal receives, between the first moment and the second moment, an initial character that is of a second message (the second message includes X characters, and X is an integer greater than 0) and that is entered by the user, because the second message sent by the second terminal is not complete, the first terminal may display, in the dialog area, the second message as a message earlier than the first message, that is, the latest message is still the first message at this time.

In a possible design method, after receiving, at the second moment, the preset character sent by the second terminal, the first terminal may update displayed information in the dialog area based on the receiving time of the initial character in the first message and an input time of the initial character in the second message, so that the first message is displayed as a message earlier than the second message, so that the first message is displayed as a message earlier than the second message. In this way, an actual time sequence relationship between chat messages in the dialog area is restored.

According to a third aspect, this application provides a message display method, including: A first terminal displays a chat window for chatting with a second terminal, where the chat window includes an input box and a dialog area. The first terminal receives a first message entered by a user, and sends the first message to the second terminal in real time. The first terminal may display, in the dialog area based on an input time of an initial character in the first message, a first message box corresponding to the first message; and update and display content of the first message in the first message box (and/or the input box) with input of the user, until a preset character indicating that the first message is complete is received. In addition, the first terminal may further receive a second message sent by the second terminal; display, in the dialog area based on a receiving time of an initial character in the second message, a second message box corresponding to the second message; and display content of the received second message in real time in the second message box. A display order of the first message box and the second message box in the dialog area is consistent with a relationship between the input time of the initial character in the first message and the receiving time of the initial character in the second message. In other words, the display sequence of the first message box and the second message box in the dialog area is arranged according to time points at which a receiver and a sender initiate the chat, and a time sequence relationship between the messages is in order. Therefore, a plurality of messages are displayed on a terminal in a correct time sequence, thereby improving input efficiency and use experience of a user w % ben the user uses the terminal to chat.

In a possible design method, the updating and displaying content of the first message in the first message box and/or the input box with input of the user, until a preset character indicating that the first message is complete is received specifically includes: displaying, in the first message box and the input box in real time, content that is of the first message and that is entered by the user.

Alternatively, the updating and displaying content of the first message in the first message box and/or the input box with input of the user, until a preset character indicating that the first message is complete is received specifically includes: Before the preset character indicating that the first message is complete is received, only the initial character in the first message is displayed in the first message box. However, the content of the first message may be updated and displayed in the input box with the input of the user, until the preset character indicating that the first message is complete is received. After the preset character indicating that the first message is complete is received, all content of the first message is displayed in the first message box, and all characters in the first message are cleared from the input box.

According to a fourth aspect, this application provides a message display method, including. A first terminal displays a chat window for chatting with a second terminal, where the chat window includes an input box and a dialog area. The first terminal receives a first message entered by a user, and sends the first message to the second terminal in real time. The first terminal may display, in the dialog area based on an input time of an initial character in the first message, a first message box corresponding to the first message; and update and display content of the first message in the first message box (and/or the input box) with input of the user, until a preset character indicating that the first message is complete is received. In addition, the first terminal may further receive a second message sent by the second terminal, where a receiving time of an initial character in the second message is earlier than the input time of the initial character in the first message.

Before a preset character indicating that the second message is complete is received, the second message sent by the other party is not complete, and the user focuses on specific content of the second message. Therefore, the first terminal may display the second message box corresponding to the second message as a message box of a latest message, and display content of the received second message in the second message box in real time. After receiving the preset character indicating that the second message is complete, the first terminal may update and display, in the dialog area based on the receiving time of the initial character in the second message, the second message box corresponding to the second message, so that a display sequence of the first message box and the second message box in the dialog area is consistent with a relationship between the input time of the initial character in the first message and the receiving time of the initial character in the second message. In this way, an actual time sequence relationship between chat messages in the dialog area is restored.

According to a fifth aspect, this application provides a terminal, including a touchscreen, one or more processors, a memory, and one or more programs. The processor is coupled to the memory, and the one or more programs are stored in the memory. When the terminal runs, the processor executes the one or more programs stored in the memory, so that the terminal performs any one of the foregoing message display methods.

According to a sixth aspect, an embodiment of this application provides a graphical user interface (GUI) on a terminal, where the terminal includes a touchscreen, one or more processors, a memory, and one or more programs. The graphical user interface includes a user interface displayed according to any one of the foregoing message display methods.

According to a seventh aspect, this application provides a computer storage medium. The computer storage medium includes a computer instruction. When the computer instruction is run on a terminal, the terminal is enabled to perform the foregoing data restoration method used when a terminal is restored to factory settings.

According to an eighth aspect, this application provides a computer program product. When the computer program product is run on a computer, the computer is enabled to perform the foregoing data restoration method used when a terminal is restored to factory settings.

It may be understood that the terminal according to the fifth aspect, the graphical user interface according to the sixth aspect, the computer storage medium according to the seventh aspect, and the computer program product according to the eighth aspect are all used to perform the corresponding methods provided above. Therefore, for advantageous effects that the terminal, the graphical user interface, the computer storage medium, and the computer program product can achieve, refer to advantageous effects in the corresponding methods provided above. Details are not described again herein.

DESCRIPTION OF EMBODIMENTS

The following describes implementations of the embodiments of this application in detail with reference to the accompanying drawings.

Figure 1A:
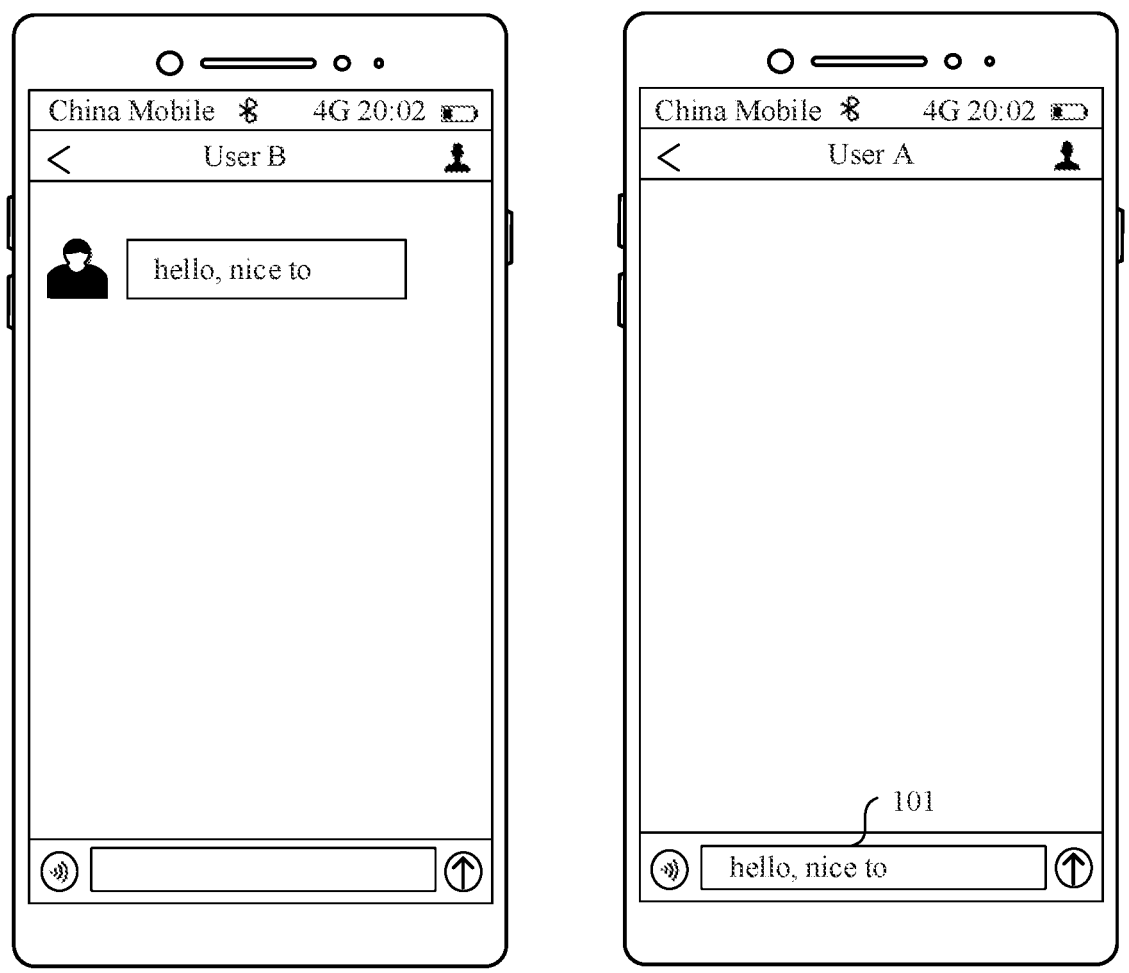
FIG. 1(a) to FIG. 1(c) are schematic diagrams of a message sending and receiving process in an RTT scenario in the prior art.
Figure 1B:
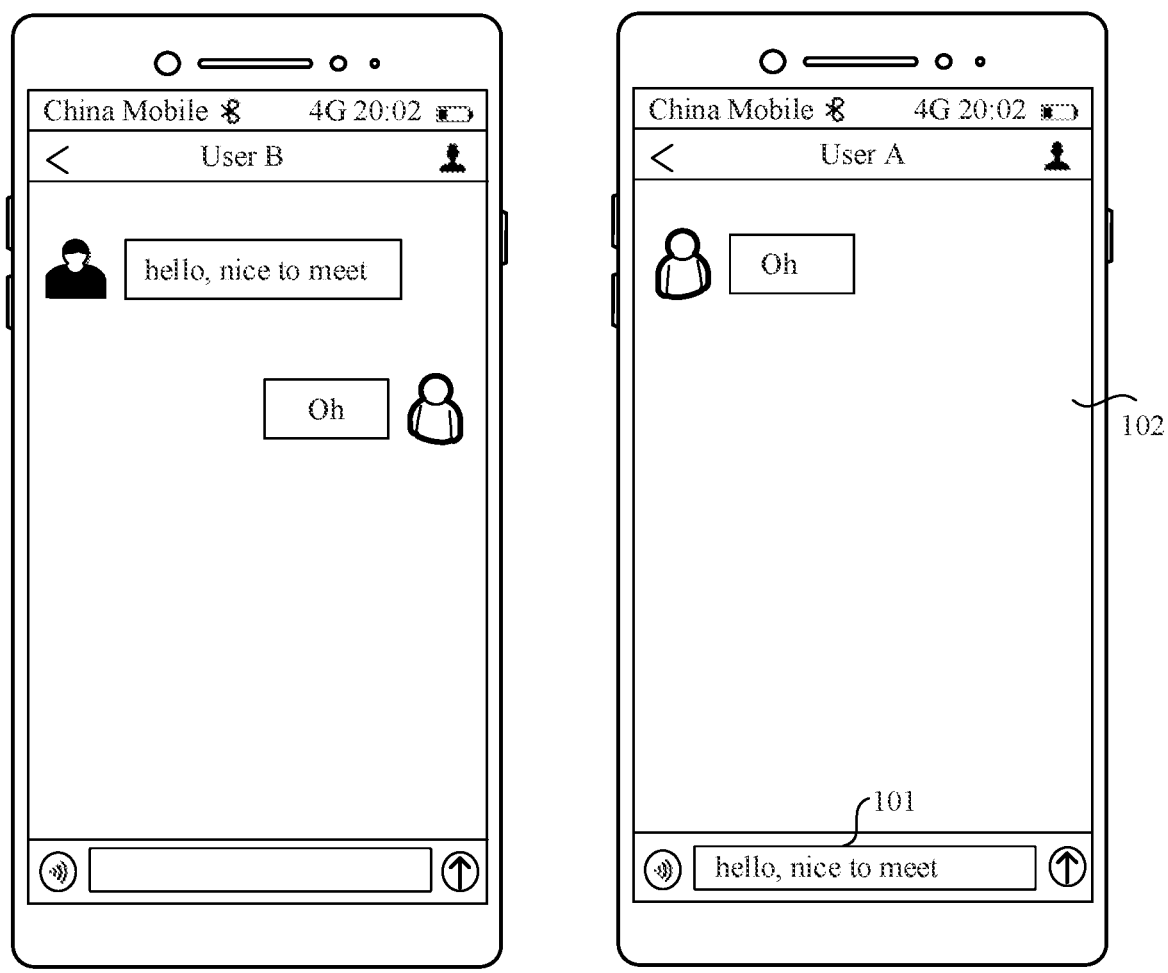
Figure 1C:
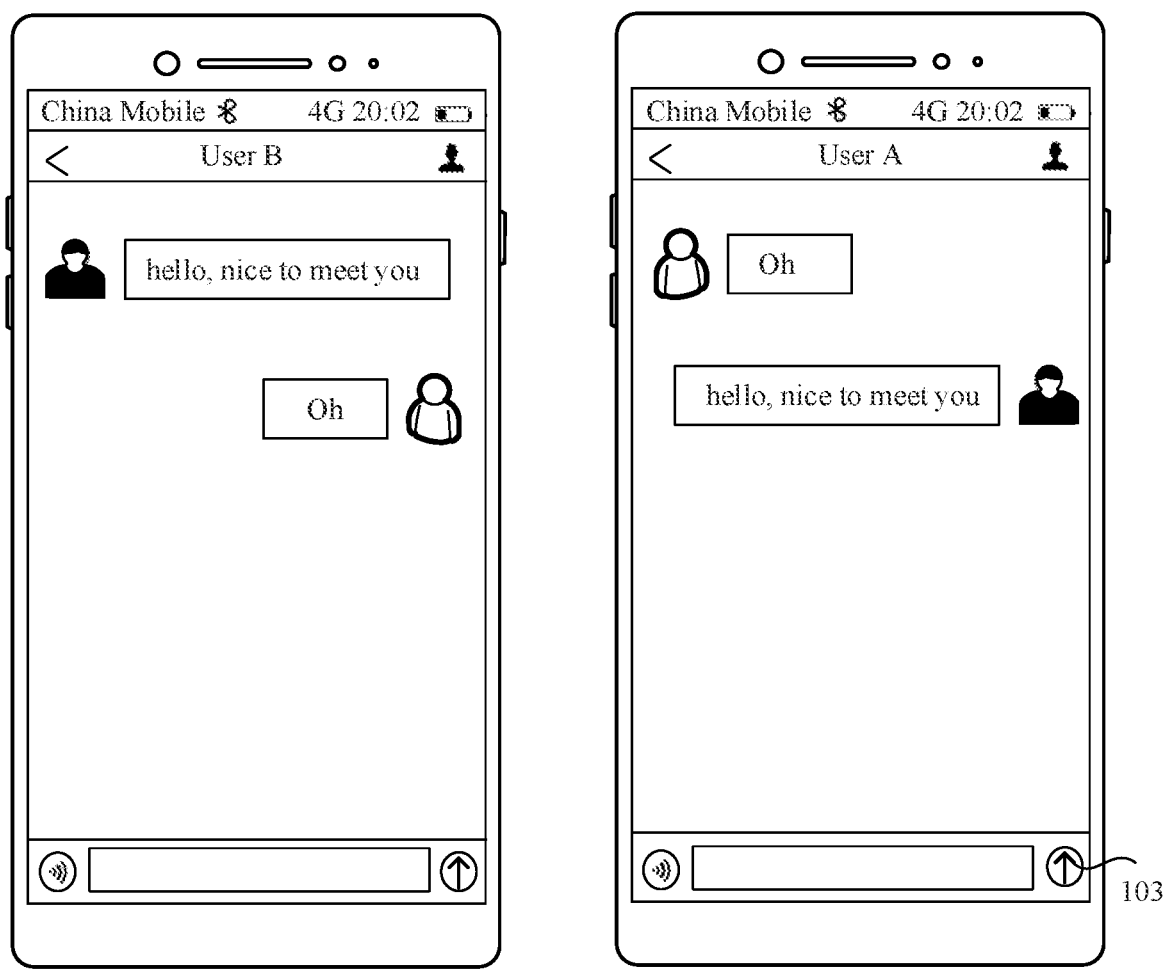
Figure 2A:
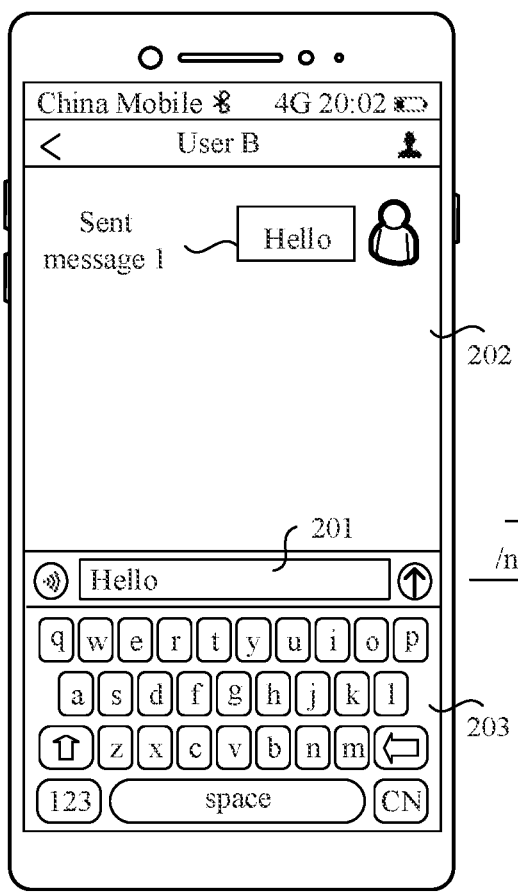
FIG. 2(a) and FIG. 2(b) are a schematic diagram 1 of a scenario of a message display method according to an embodiment of this application.
Figure 2B:
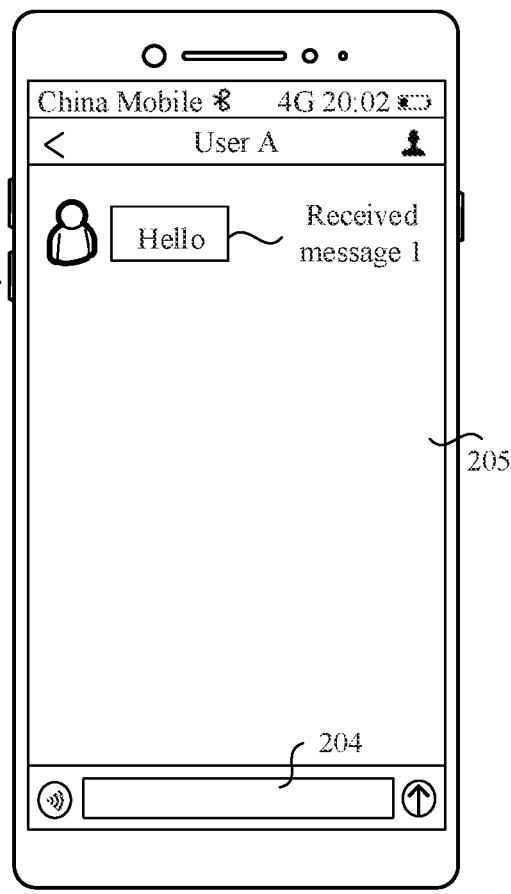

A message display method provided in the embodiments of this application may be applied to a chat scenario including at least two terminals. For example, as shown in FIG. 2(a) and FIG. 2(b), a user A chats with a user B by using a chat application in a terminal 100, and the user B chats with the user A by using the same chat application in a terminal 200. A communication connection may be established between the terminal 100 and the terminal 200 via a base station or a server, or a communication connection may be established through Wi-Fi (wireless-fidelity, wireless-fidelity), Bluetooth, or the like. The chat application may be an instant messaging application, or may be an application such as Messages. This is not limited in the embodiments of the present invention.

Generally, messages generated during the chat between the user A and the user B include both a sent message and a received message. For the user A, a message sent by the user A to the terminal 200 by using the terminal 100 is a sent message, and a message received by the terminal 100 from the terminal 200 is a received message. For the user B, a message sent by the user B to the terminal 100 by using the terminal 200 is a sent message, and a message received by the terminal 200 from the terminal 100 is a received message.

For example, the user A sends a message to the terminal 200 of the user B by using the terminal 100. As shown in FIG. 2(a), the terminal 100 displays a status bar that includes operator information, a Bluetooth function enabling indicator, a network standard, time, and a battery level, and a chat window for chatting with the user B is under the status bar. The chat window for chatting with the user B includes a name and portrait information of the user B, a first input box 201, a first dialog area 202, and a first virtual keyboard 203. The first dialog area 202 is used to display a sent message and a received message of the terminal 100, and the first input box 201 is used to display a sent message entered by the user A this time. When the user A does not need to enter a to-be-sent message into the input box 201, the user A may disable the first virtual keyboard 203. Similarly, a chat window, for chatting with the user A, displayed on the terminal 200 may include a second input box 204, a second dialog area 205, a second virtual keyboard (not shown in FIG. 2(b)), and the like. This is not limited in the embodiments of this application.

In an embodiment of this application, still as shown in FIG. 2(a), when the terminal 100 detects that the user A enters one or more characters into the first input box 201 through voice or keys, the terminal 100 may record an input time of an initial character (for example, an input time of "H"), and the terminal 100 may create a message box in the first dialog area 202, and synchronously display, in the message box, a character (that is, a sent message 1) received in the first input box 201. A sending time of the sent message 1 is the input time of the initial character "H" in the sent message 1.

For example, the message box created by the terminal 100 for the sent message 1 in the first dialog area 202 may be a bubble, and the terminal 100 may display, in the bubble in sequence, each character entered by the user A into the first input box 201. In addition, the terminal 100 presets one or more preset characters (for example, a carriage return character or a line feed character), and the preset character is used to indicate that the sent message that is entered by the user this time is complete. If the terminal 100 receives, in the first input box 201, the preset character entered by the user A, the terminal 100 may clear all content in the first input box 201. In this case, content of the sent message 1 that is displayed in the first dialog area 202 does not change.

When the terminal 100 receives one or more characters entered by the user A into the first input box 201, the terminal 100 may further send these characters to the terminal 200 in real time according to an input sequence of the characters entered by the user. For example, once the user A completes entering of a character, the terminal 100 sends the character to the terminal 200. For a specific implementation process, refer to a related technology of RTT. Details are not described in the embodiments of the present invention. Still as shown in FIG. 2(a) and FIG. 2(b), when the user A sequentially enters all letters of the word "Hello" into the first input box 201, the terminal 100 may sequentially send the received five characters, "H", "e", "l", "l", and "o", to the terminal 200. When receiving the initial character "H" sent by the terminal 100, the terminal 200 may record a receiving time of the initial character. Further, as shown in FIG. 2(b), the terminal 200 may use the receiving time of the initial character "H" as a receiving time of a received message 1, and create a message box in the second dialog area 204. In the message box, the terminal 200 may synchronously display each character sent by the terminal 100, so that the user B can view the message sent by the user A in real time.

When the terminal 200 receives the preset character, for example, a feed line character (/n), sent by the terminal 100, it may be considered that content of the received message 1 sent by the terminal 100 is complete. In this case, content of the received message 1 that is displayed in the second dialog area 204 does not change. Subsequently, if the terminal 200 receives a new character sent by the terminal 100, the terminal 200 may record and display the new character as an initial character in a next received message.

It should be noted that, in the foregoing embodiment, an example in which the terminal 100 sends a message to the terminal 200 and the terminal 200 serves as a receiving end to receive the message is used for description. It may be understood that the terminal 100 may alternatively serve as a receiving end to receive a message sent by the terminal 200. This is not limited in the embodiments of this application.

It can be learned that, in the embodiments of this application, when a terminal sends a message, the terminal uses an input time of an initial character in the message as a sending time of the message, and the input time of the initial character in the sent message may reflect a time point at which a user at the sending end initiates the chat. When the terminal displays a plurality of sent messages, the plurality of sent messages may be sorted according to a sending time sequence of the messages. Similarly, when the terminal receives a message, the terminal uses a receiving time of an initial character in the message as a receiving time of the message, and the receiving time of the initial character in the received message may reflect a time point at which a user at a receiving end initiates the chat. When the terminal displays a plurality of received sent messages, the plurality of received messages may be sorted according to a receiving time sequence of the messages. In this way, messages displayed by the terminal in a dialog area are arranged according to time points at which the users initiate the chat, and a time sequence relationship between the messages is in order. Therefore, the plurality of messages are displayed on the terminal in a correct time sequence, thereby improving input efficiency and use experience of the user when the user uses the terminal to chat.

In addition, the chat scenario shown in FIG. 2(*a*) and FIG. 2(*b*) may be considered as a typical application scenario in an RTT technology. In the RTT technology, when text information that needs to be transmitted is created or entered, once a character entered by a user is received, the character may be sent to and displayed on the receiving end immediately (for example, within a fraction of a second). This means that when a sender is entering text information, the user at the receiving end can read the text entered by the sender. In this manner, real-time text has the same conversational directness and interactivity as voice.

Currently, standards related to the RTT technology have been introduced into a plurality of protocols such as the protocol for multimedia application text conversation (protocol for multimedia application text conversation). For example, a deaf mute may use a text telephone application that supports the RTT technology, to instantly display, in a text form by using the RTT technology, voice or text information input by the other party. For another example, in a multi-party chat scenario such as a group chat, a message entered by each user in a group may also be displayed in real time by using the RTT technology. The message display method provided in the embodiments of this application may be applied to various application scenarios of the RTT technology, and the embodiments of this application impose no limitation on this.

Further, the terminal 100 and the terminal 200 in the foregoing embodiments each may be specifically a mobile phone, a tablet computer, a desktop computer, a laptop computer, a notebook computer, an ultra-mobile personal computer (ultra-mobile personal computer, UMPC), a handheld computer, a netbook, a personal digital assistant (personal digital assistant, PDA), a wearable electronic device, a virtual reality device, or the like. A specific form of the terminal is not specifically limited in the embodiments of this application.

Figure 3:
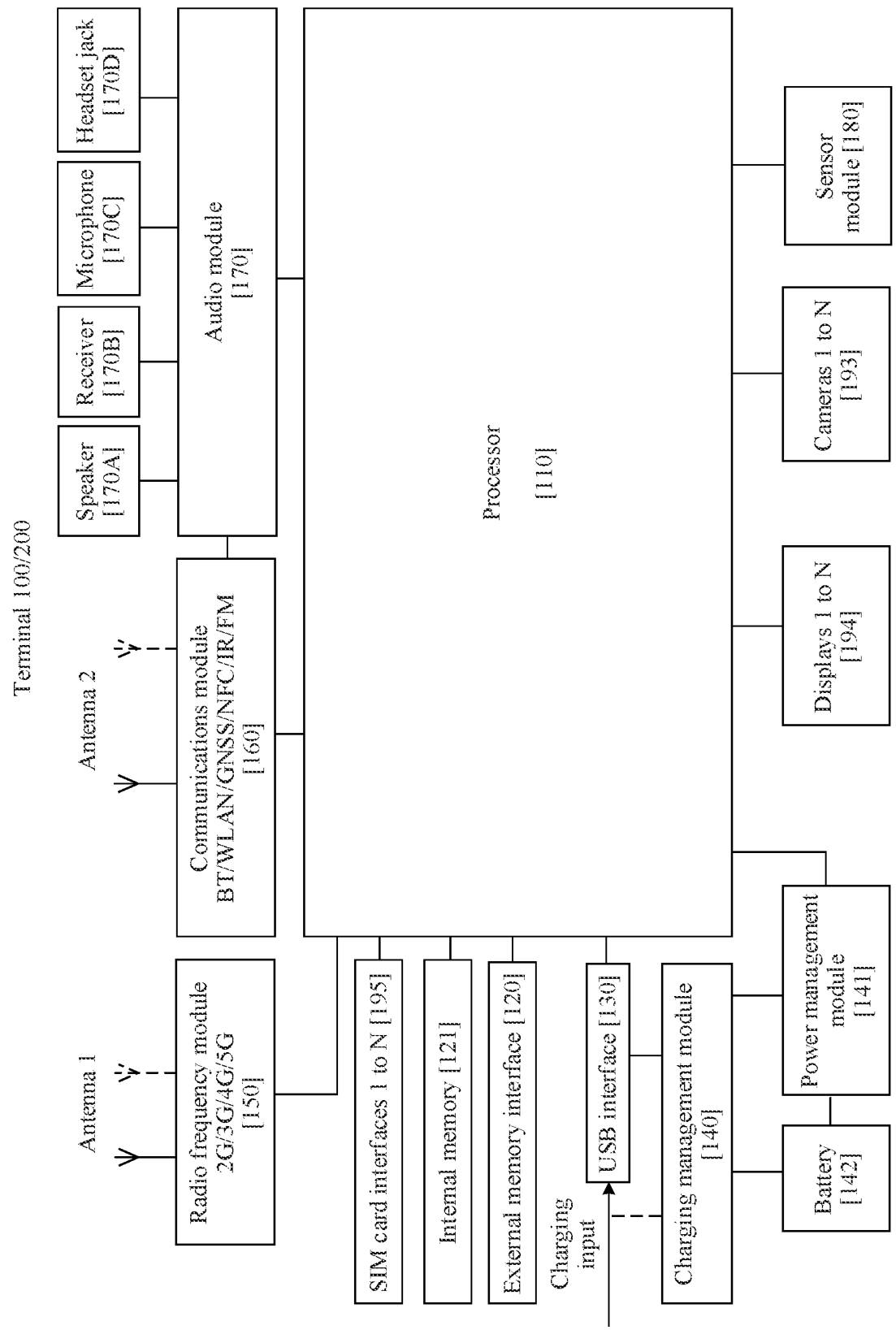
FIG. 3 is a schematic structural diagram 1 of a terminal according to an embodiment of this application.

FIG. 3 is a structural block diagram of the terminal 100 and the terminal 200 in the foregoing embodiments. The terminal 100 and the terminal 200 each may include a processor 110, an external memory interface 120, an internal memory 121, an antenna 1, an antenna 2, a radio frequency module 150, a communications module 160, an audio module 170, a speaker 170A, a receiver 170B, a microphone 170C, a headset jack 170D, and a sensor module 180, a camera 193, a display 194, and the like.

The structure exemplified in the embodiments of the present invention does not constitute a limitation on the terminal 100 or the terminal 200. The terminal may include more or fewer components than those shown in the figure, or some components may be combined, or some components may be split, or the terminal may have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural processing unit (Neural-network Processing Unit, NPU), and/or the like. Different processing units may be independent devices, or may be integrated into one or more processors.

A wireless communication function of the terminal 100 and terminal 200 may be implemented via the antenna module 1, the antenna module 2 the radio frequency module 150, the communications module 160, a modem, the baseband processor, and the like.

The antenna 1 and the antenna 2 are configured to send and receive an electromagnetic wave signal Each antenna in the terminal 100 and terminal 200 may be configured to cover one or more communications frequency bands. Different antennas may be multiplexed to improve antenna utilization. For example, a cellular network antenna may be multiplexed as a wireless local area network diversity antenna. In some embodiments, an antenna may be used in combination with a tuning switch.

The radio frequency module 150 may provide a communications processing module that is applied to the terminal 100 and the terminal 200 and that includes a wireless communication solution such as 2G/3G/4G/5G. The radio frequency module may include at least one filter, a switch, a power amplifier, a low noise amplifier (Low Noise Amplifier, LNA), and the like. The radio frequency module may receive an electromagnetic wave via the antenna 1, perform processing such as filtering or amplification on the received electromagnetic wave, and transfer the electromagnetic wave to the modem for demodulation. The radio frequency module may further amplify a signal modulated by the modem, and convert the signal into an electromagnetic wave for radiation via the antenna 1. In some embodiments, at least some function modules in the radio frequency module 150 may be disposed in the processor 150. In some embodiments, at least some function modules in the radio frequency module 150 may be disposed in a same device as at least some modules in the processor 110.

The modem may include a modulator and a demodulator. The modulator is configured to modulate a to-be-sent low-frequency baseband signal into an intermediate-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal via an audio device (not limited to the speaker, the receiver, or the like), or displays an image or a video via the display. In some embodiments, the modem may be an independent device. In some embodiments, the modem may be independent of the processor, and is disposed in a same device as the radio frequency module or another function module.

The communications module 160 may provide a communications processor module that is applied to the terminal 100 and the terminal 200 and that includes a wireless communication solution such as a wireless local area network (wireless local area networks, WLAN), Bluetooth (bluetooth, BT), a global navigation satellite system (global navigation satellite system, GNSS), frequency modulation (frequency modulation, FM), a near field communication (near field communication, NFC) technology, or an infrared (infrared, IR) technology. The communications module 160 may be one or more devices integrating at least one communications processing module. The communications module receives an electromagnetic wave by using the antenna 2, performs frequency modulation and filtering processing on an electromagnetic wave signal, and sends a processed signal to the processor. The communications module 160 may further receive a to-be-sent signal from the processor, perform frequency modulation and amplification on the signal, and convert the signal into an electromagnetic wave for radiation via the antenna 2.

In some embodiments, in the terminal 100 and the terminal 200, the antenna 1 and the radio frequency module are coupled, and the antenna 2 and the communications module are coupled, so that the terminal 100 and the terminal 200 can communicate with a network and another device by using a wireless communications technology. The wireless communications technology may include a technology such as global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR. The GNSS may include a global positioning system (global positioning system. GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The terminal 100 and the terminal 200 each implement a display function via the GPU, the display 194, the application processor, and the like. The GPU is a microprocessor for image processing, and is connected to the display and the application processor. The GPU is configured to perform mathematical and geometric calculation, and is configured to render an image. The processor 110 may include one or more GPUs that execute a program instruction to generate or change display information.

The display 194 is configured to display an image, a video, and the like. The display includes a display panel. The display panel may use an LCD (liquid crystal display, liquid crystal display), an OLED (organic light-emitting diode, organic light-emitting diode), an active-matrix organic light-emitting diode or an active-matrix organic light-emitting diode (active-matrix organic light emitting diode, AMO-LED), a flexible light-emitting diode (flex light-emitting diode. FLED), a mini-LED, a micro-LED, a micro-OLED, a quantum dot light-emitting diode (quantum dot light emitting diodes, QLED), or the like. In some embodiments, the terminal 100 and the terminal 200 each may include one display or N displays, where N is a positive integer greater than 1.

The terminal 100 and the terminal 200 each can implement a photographing function by using the ISP, the camera 193, the video codec, the GPU, the display, the application processor, and the like.

The ISP is configured to process data fed back by the camera. The camera 193 is configured to capture a static image or a video. An optical image is generated for an object by using a lens and is projected onto a photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signals in a standard format such as RGB or YUV. In some embodiments, the terminal 100 may include one camera or N cameras, where N is a positive integer greater than 1. The digital signal processor is configured to process a digital signal. The video codec is configured to compress or decompress a digital video. The terminal 100 may support one or more types of codecs. In this way, the terminal 100 may play or record videos in a plurality of coding formats, for example, MPEG1, MPEG2, MPEG3, and MPEG4.

The external memory interface 120 may be configured to connect to an external storage card such as a micro SD card, to extend storage capabilities of the terminal 100 and the terminal 200. The external storage card communicates with the processor through the external memory interface, to implement a data storage function. For example, music and videos are stored in the external storage card.

The internal memory 121 may be configured to store computer-executable program code, and the executable program code includes an instruction. The processor 110 runs the instruction stored in the internal memory 121, to implement various function applications of the terminal 100 and the terminal 200 and process data. The memory 121 may include a program storage area and a data storage area. The program storage area may store an operating system, an application required by at least one function (for example, a voice playing function or an image playing function), and the like. The data storage area may store data (such as audio data and a phone book) created during use of the terminal 100 and the terminal 200, and the like. In addition, the memory 121 may include a high-speed random access memory, and may further include a nonvolatile memory, for example, at least one magnetic disk storage device, a flash storage device, another volatile solid-state storage device, or a universal flash storage (universal flash storage. UFS).

The terminal 100 and the terminal 200 each may implement an audio function, for example, music playing and recording, by using the audio module 170, the speaker 170A, the receiver 170B, the microphone 170C, the headset jack 170D, the application processor, and the like The sensor module 180 of each of the terminal 100 and the terminal 200 may specifically include a pressure sensor, a gyro sensor, a barometric pressure sensor, a magnetic sensor (for example, a Hall effect sensor), an acceleration sensor, a distance sensor, an optical proximity sensor, an ambient light sensor, a fingerprint sensor, a temperature sensor, a bone conduction sensor, a touch sensor, and the like. The touch sensor is also referred to as a "touch panel", may be disposed on the display, and is configured to detect a touch operation performed on or near the touch panel. The touch sensor may transfer the detected touch operation to the application processor, to determine a type of the touch event, and to provide corresponding visual output by using the display.

The terminal 100 and the terminal 200 each may further include components such as a USB interface 130, a charging management module 140, a power management module 141, a battery 142, and a SIM card interface 195. This is not limited in the embodiments of this application.

In an embodiment of this application, the terminal 100 is used as an example. After the terminal 100 displays, on the display screen 194, a chat application interface for chatting with a contact B, the touch sensor 180K may detect each character entered by the user into an input box, and report the detected character to the processor 110. After an initial character that appears in the input box is detected, the processor 110 may record an input time of the initial character, and create a sent message in a dialog area to synchronously display each character that appears in the input box. A sending time of the sent message is the input time of the initial character in the sent message. Therefore, a location of the sent message in a plurality of messages is also determined based on the input time of the initial character in the sent message.

In addition, each time it is detected that the user enters a new character into the input box, the processor 110 may send, by using the communications module 160 or the radio frequency module 150, the character to a terminal of the contact B for synchronous display. Similarly, the terminal 100 may further receive, by using the communications module 160 or the radio frequency module 150, each character in a message (that is, a received message of the terminal 100) sent by another terminal (for example, the terminal 200), and report the received character to the processor 110. Similar to processing of the foregoing sent message, the processor 110 may record a receiving time of an initial character in the foregoing received message, and create a received message in the dialog area to synchronously display each character sent by the terminal 200. A receiving time of the received message is the receiving time of the initial character in the received message. Therefore, a location of the received message in a plurality of messages is determined based on the receiving time of the initial character in the received message.

In this way, sent messages displayed on the terminal 100 are arranged according to a sequence in which the input party initiates the chat, and received messages displayed on the terminal 100 are arranged according to a sequence in which the sender initiates the chat. Therefore, a sequence of the messages displayed on the terminal 100 can reflect a real time sequence relationship in an actual chat process, thereby improving input efficiency and use experience of a user when the user uses the terminal to chat.

A software system of each of the terminal 100 and the terminal 200 may use a layered architecture, an event-driven architecture, a microkernel architecture, a micro service architecture, or a cloud architecture. In the embodiments of this application, an Android system with the layered architecture is used as an example to describe software structures of the terminal 100 and the terminal 200.

Figure 4:
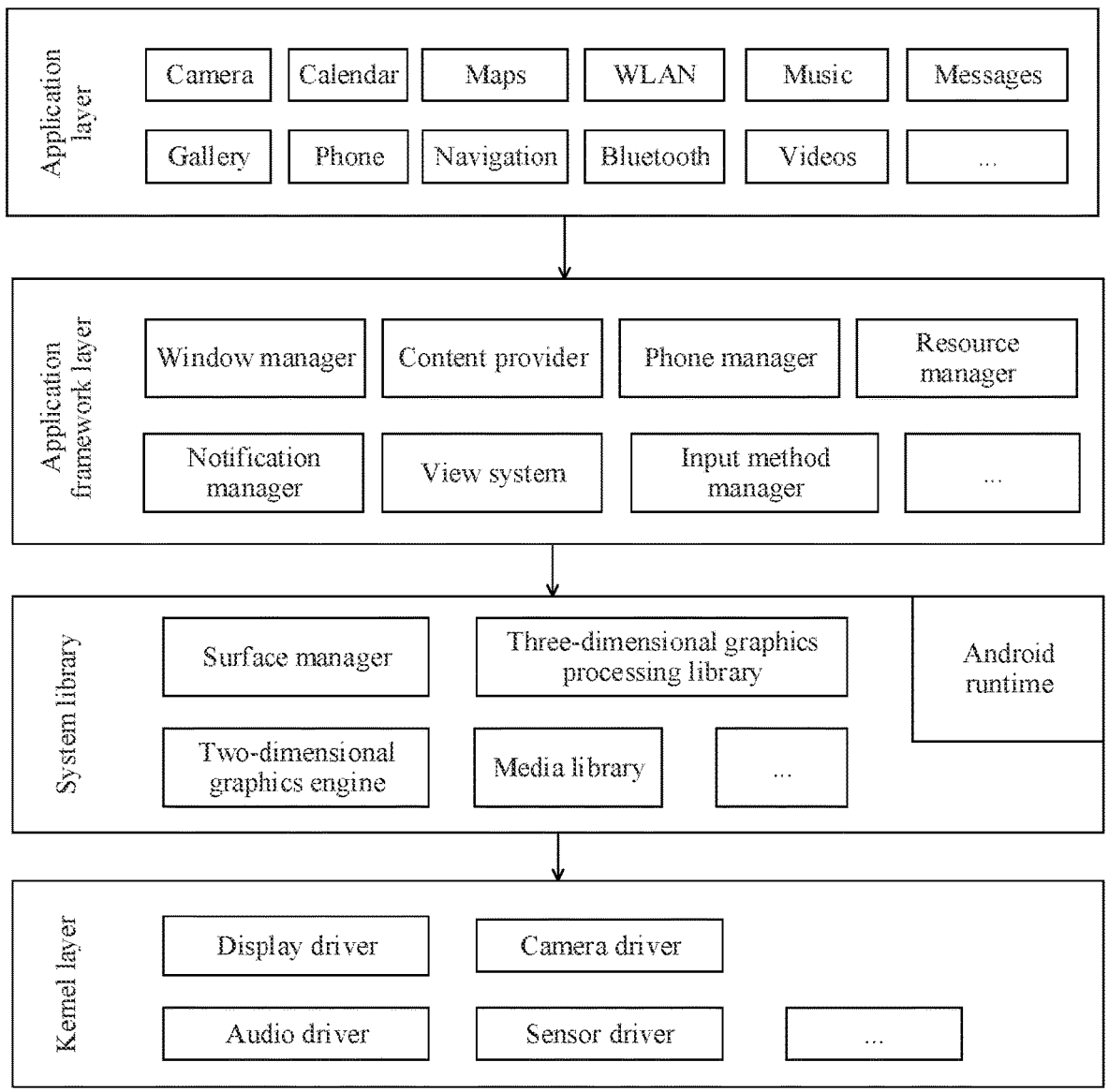
FIG. 4 is a schematic structural diagram of an operating system in a terminal according to an embodiment of this application.

FIG. 4 is a block diagram of the software structure of the terminal 100 and the terminal 200 according to an embodiment of the present invention.

The software is divided into several layers by using the layered architecture, and each layer has clear roles and responsibilities. The layers communicate with each other through interfaces. In some embodiments, the Android system is divided into four layers, namely, an application layer, an application framework layer, Android runtime (Android runtime), a system library, and a kernel layer from top to bottom.

The application layer may include a series of application packages.

As shown in FIG. 4, the application packages may include applications such as Camera, Gallery, Calendar. Phone, Maps, Navigation, WLAN, Bluetooth, Music, Videos, Messages, and Instant Messaging.

The application framework layer provides an application programming interface (application programming interface, API) and a programming framework for an application at the application layer. The application framework layer includes some predefined functions.

As shown in FIG. 4, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot of the display, and the like. The content provider is configured to: store and obtain data, and make the data accessible to an application. The data may include a video, an image, audio, calls that are made and received, a browsing history and bookmarks, an address book, and the like. The view system includes visual controls such as a control for displaying text and a control for display a picture. The view system can be used to construct an application. A display interface may include one or more views. For example, a display interface including an SMS message notification icon may include a text display view and a picture display view. The phone manager is configured to provide a communication function of the terminal 100 and the terminal 200, for example, to manage a call status (including answering or declining). The resource manager provides various resources for an application, such as localized strings, icons, pictures, layout files, and video files. The notification manager enables an application to display notification information in a status bar, and may be configured to convey a notification-type message. The notification-type message may automatically disappear after the message is displayed for a short period of time, without user interaction. For example, the notification manager is configured to notify that download is completed, a message reminder, and the like. The notification manager may alternatively be a notification that appears on the top of a status bar of a system in a text form of a graph or a scroll bar, for example, a notification of an application running in the background or a notification that appears on a screen in a form of a dialog window. For example, text information is prompted in the status bar, an alert sound is produced, the terminal vibrates, or the indicator light blinks.

The Android runtime includes a kernel library and a virtual machine, and the Android runtime is responsible for scheduling and management of the Android system.

The kernel library includes two parts: a function that needs to be invoked by a Java language and a kernel library of Android.

The application layer and the application framework layer may run in the virtual machine. The virtual machine executes a Java file at the application layer and the application framework layer as a binary file. The virtual machine is configured to perform functions such as object lifecycle management, stack management, thread management, security and exception management, and garbage collection.

The system library may include a plurality of function modules, for example, a surface manager (surface manager), a media library (media libraries), a three-dimensional graphics processing library OpenGL ES, and a 2D graphics engine SGL.

The surface manager is configured to: manage a display subsystem, and provide fusion of 2D and 3D layers for a plurality of applications. The media library supports playback and recording of a plurality of commonly used audio and video formats, static image files, and the like. The media library may support a plurality of audio and video coding formats such as MPEG4, H.264, MP3, AAC, AMR, JPG, and PNG. OpenGL ES is configured to implement three-dimensional graphics drawing, image rendering, composition, layer processing, and the like. SGL is a 2D drawing engine.

The kernel layer is a layer between hardware and software. The kernel layer includes at least a display driver, a camera driver, an audio driver, and a sensor driver.

In this embodiment of this application, the application layer may include any application that supports an RTT technology, for example, a call application and a chat application. A user may use these applications to chat with another user by using text. In addition, the application framework layer further includes an input method manager (input method manager, IMM), and the input method manager may provide an input method service for each application.

A chat application is used as an example. After a user opens the chat application, the chat application may run at an application layer as an activity. If it is detected that the user taps an input box in the chat application, the chat application may invoke an input method manager to display a corresponding virtual keyboard. The user may enter, into the input box by using the virtual keyboard, content of a message that needs to be sent. In addition, the chat application may further synchronously display, in a dialog area of the chat application, the sent message that is entered by the user into the input box. A sending time of the sent message is an input time of an initial character in the sent message in the input box. The sent message and other messages in the dialog area are also arranged according to a sending time (that is, an input time of an initial character) of each message.

In addition, in the chat application, a message from another terminal may be further received, and the received message is synchronously displayed in the dialog area. A receiving time of the received message is a receiving time of an initial character in the received message. The received message and other messages in the dialog area are also arranged according to a receiving time (that is, a receiving time of an initial character) of each received message. The input time of the initial character in the sent message can reflect a time point at which a user at the sending end initiates the chat, and the receiving time of the initial character in the received message can reflect a time point at which a user at the receiving end initiates the chat. Therefore, an arrangement sequence of messages displayed in the chat window by using the foregoing method can reflect a time sequence relationship in an actual chat process.

For ease of understanding, the following specifically describes, with reference to the accompanying drawings, a message display method provided in an embodiment of this application. In the following embodiments, a chat process between a mobile phone A and a mobile phone B is used as an example for description.

Figure 5:
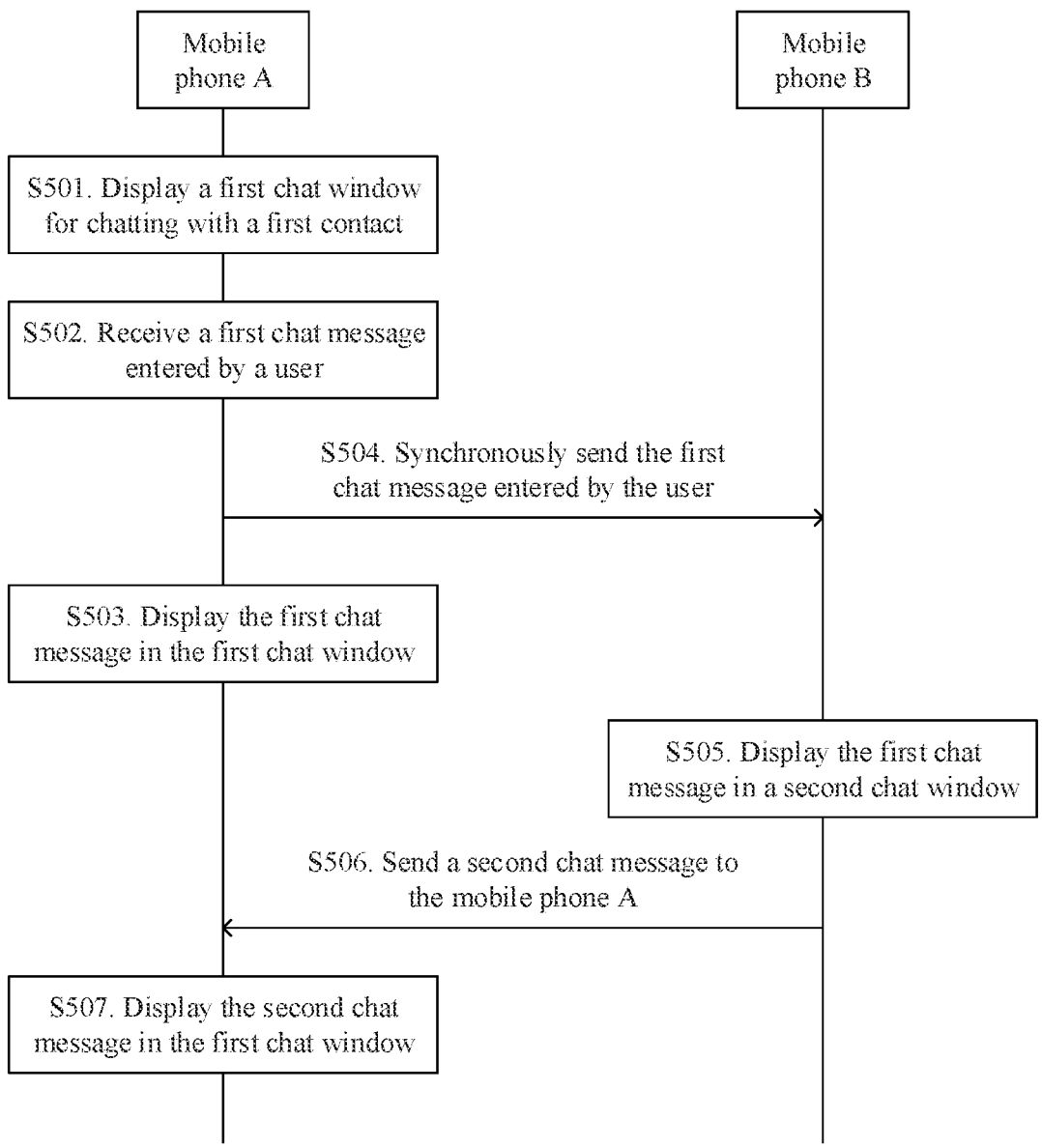
FIG. 5 is a schematic interaction diagram of a message display method according to an embodiment of this application.

FIG. 5 is a schematic flowchart of a message display method according to an embodiment of this application. As shown in FIG. 5, the message display method may include the following steps.

S501. A mobile phone A displays a first chat window for chatting with a first contact.

Figure 6A:
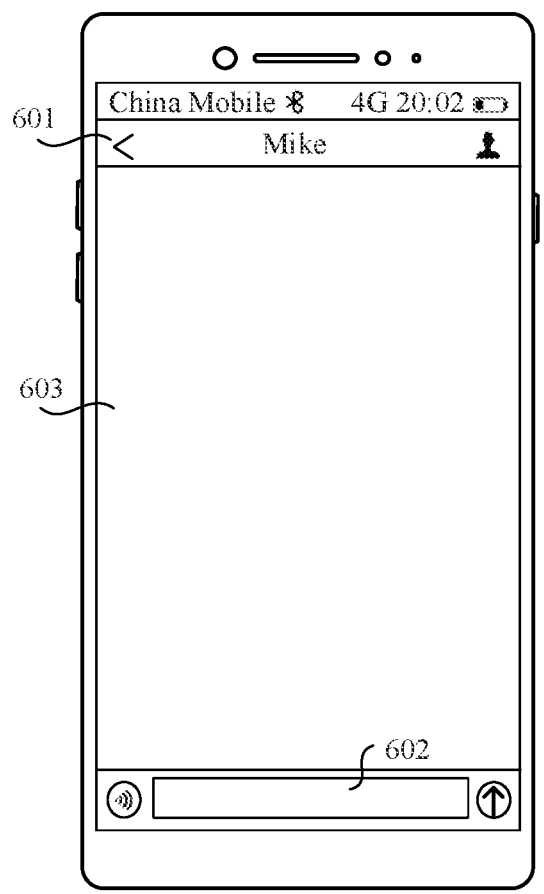
FIG. 6(a) and FIG. 6(b) are a schematic diagram 2 of a scenario of a message display method according to an embodiment of this application.

After the mobile phone A starts a call application or a chat application, a user (for example, Sara) may choose to enter the first chat window for chatting with the first contact (for example, Mike). As shown in FIG. 6(a), the first chat window 601 displayed on the mobile phone A includes a first input box 602 and a first dialog area 603 for chatting with the contact Mike. The user Sara may enter, into the first input box 602 by using an input method application, a message (that is, a sent message of the mobile phone A) to be sent to Mike.

Figure 6B:
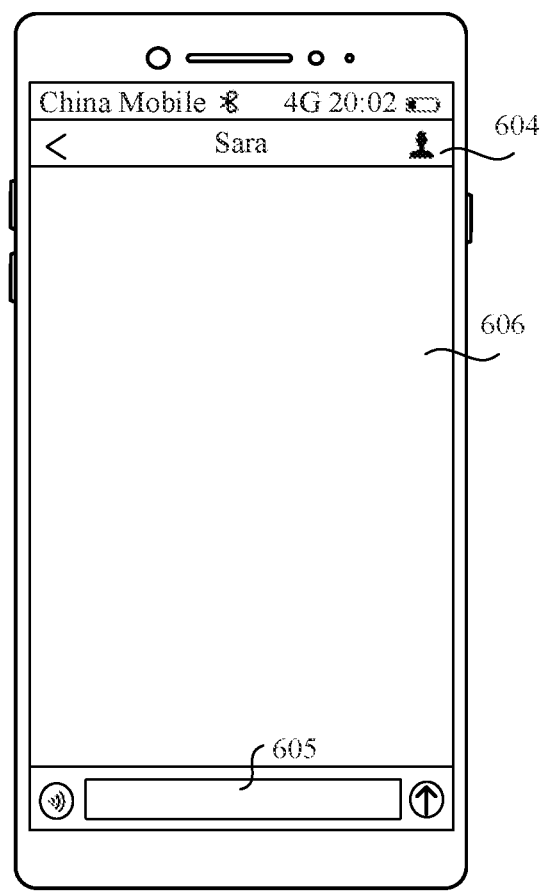

Correspondingly, as shown in FIG. 6(b), a mobile phone B of the first contact Mike may display a second chat window 604 for chatting with the user Sara. The second chat window 604 includes a second input box 605 and a second dialog area 606 for chatting with the contact Sara. Mike may enter, into the second input box 605 by using an input method application, a message (that is, a received message of the mobile phone A) to be sent to Sara.

Figure 7:
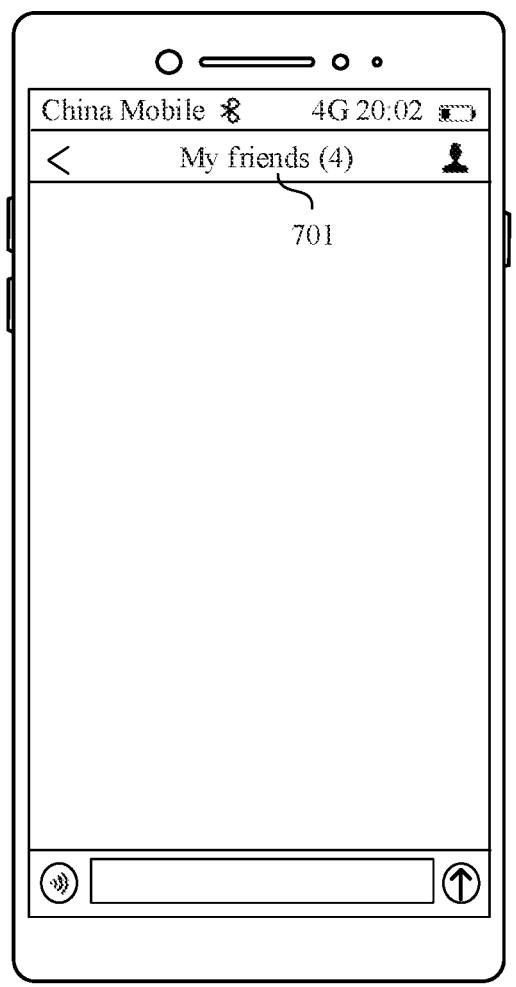
FIG. 7 is a schematic diagram 3 of a scenario of a message display method according to an embodiment of this application.

In addition, in the foregoing embodiment, that the first contact is Mike is used as an example for description. It may be understood that, alternatively, there may be a plurality of first contacts. In other words, the user Sara and each contact in the first contacts belong to a same group. As shown in FIG. 7, the user Sara may open a group 701 named "My Friends", and enter a chat window for chatting with the group 701. The group 701 may include a plurality of contacts, and a message sent by any contact in the group 701 may be displayed in a chat window of the group 701.

S502. The mobile phone A receives a first message entered by the user into the first input box in the first chat window.

Figures 8A, 8B:
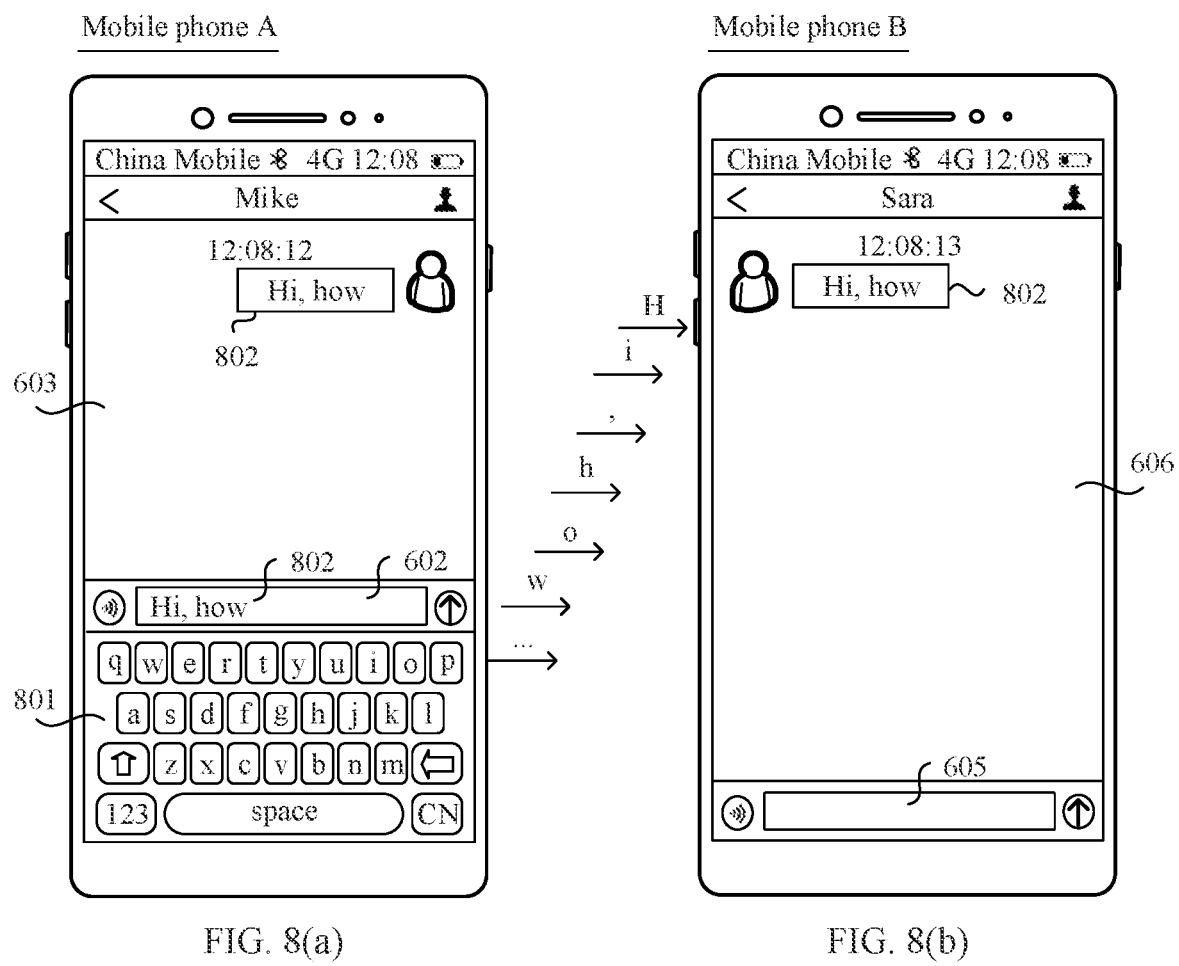
FIG. 8(a) and FIG. 8(b) are a schematic diagram 4 of a scenario of a message display method according to an embodiment of this application.

When sending a message to the first contact Mike by using the mobile phone A, the user Sara may tap the first input box 602 in the first chat window 601. In response to a tap operation of the user in the first input box 602, as shown in FIG. 8(a), the mobile phone A may invoke the input method application, and displays, in the first chat window 601, a virtual keyboard 801 provided by the input method application. In this way, the user Sara may enter, into the first input box 602 by using the virtual keyboard 801, the first message 802 sent to Mike.

Generally, there are two types of characters entered into the first input box 602. One type of character is a text character, such as a letter, a character, or a symbol, where the symbol may include punctuation, a unit, an emoticon, and the like. The other type of character is a command character, such as a delete character, a line feed character, or a carriage return character. In a process in which the user Sara enters a character into the first input box 602, specific content of the first message 802 may change with an input operation of the user Sara.

As shown in FIG. 8(a), when the mobile phone A detects the first text character (that is, the initial character "H") entered by Sara into the first input box 602, the mobile phone A may record an input time (for example, 12:08:12) of the initial character "H". At this time, the first message 802 includes only the letter "H".

When the mobile phone A receives an $N^{th}$ (N>1) text character entered by Sara into the first input box 602, the mobile phone A may display received text characters after the initial character "H" according to an input sequence. In this case, content of the first message 802 increases accordingly.

When the mobile phone A receives a command character entered by Sara into the first input box 602, the mobile phone A may perform a corresponding operation on the first message 802 in the input box. For example, if Sara enters a delete character into the first input box 602, the mobile phone A may delete one character in the current first message 802 forward. For another example, if Sara enters, into the first input box 602, a preset character, for example, a line feed character or a carriage return character, used to indicate that this message is complete, the mobile phone A may use all characters that are currently in the first input box 602 as the complete first message 802, and clear the first message 802 from the first input box 602.

Subsequently, if the mobile phone A receives a new character entered by the user Sara into the first input box 602, the mobile phone A may use the character as an initial character in a next chat message, and re-execute the method in steps S502 to S507 to display the next chat message.

In addition, when the mobile phone A receives the first message entered by Sara into the first input box 602, the mobile phone A may further perform the following steps S503 and S504. In other words, in response to an operation of entering the first message by the user, the mobile phone A may perform the following steps S503 and S504, to display the first message on the sending end (the mobile phone A) and the receiving end (the mobile phone B).

S503. The mobile phone A displays the first message in the first dialog area in the first chat window, where a sending time of the first message is the input time of the initial character in the first message.

The sent messages (including the first message) in the first dialog area are arranged according to a sending time sequence. In other words, the mobile phone A displays each message sent by the user according to a sequence of entering an initial character when the user initiates the chat.

For example, the input time of the initial character in the first message may be a time point at which the mobile phone A detects that the initial character appears in the first input box. When the first message is a voice message, the input time of the initial character in the first message may also be a time point at which the mobile phone A recognizes the initial character in the first message by using a voice recognition technology. This is not limited in the embodiments of this application.

Figure 9:
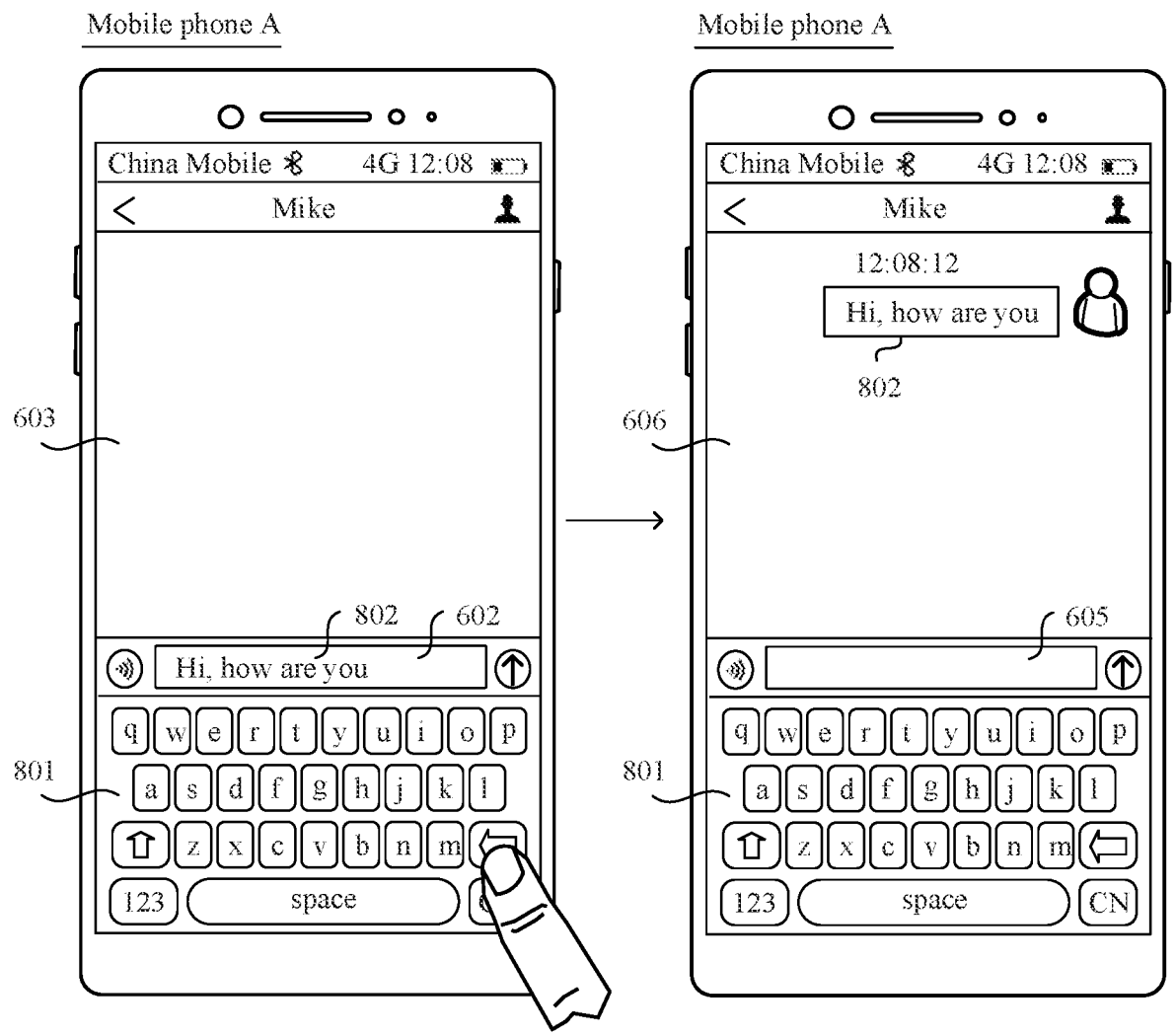
FIG. 9 is a schematic diagram 5 of a scenario of a message display method according to an embodiment of this application.

In some embodiments of this application, as shown in FIG. 9, after detecting that the user Sara enters, into the first input box 602, a line feed character that is used to complete the first message 802, the mobile phone A may display, in the first dialog area 603, all characters "Hi, how are you" in the first input box 602 as the first message 802. In addition, when the first message 802 is displayed in the first dialog area 603, the mobile phone A may further display the sending time, 12:08:12 (that is, the input time of the initial character "H"), of the first message 802.

For example, although a time point at which Sara taps a line feed key after entering "Hi, how are you" into the first input box 602 is 12:08:56, the mobile phone A displays the first message 802 "Hi, how are you" in the first chat window 601 still by using the input time of the initial character "H" as the sending time, as shown in FIG. 9. The first message 802 sent at 12:08:12 is a latest message sent by the mobile phone A, and after 12:08:12, the mobile phone A does not receive any other message sent by Mike. Therefore, as shown in FIG. 9, the mobile phone A may display the first message 802 as a latest chat record in the current first dialog area 603. The latest chat record may be displayed on the top or at the bottom of the first dialog area 603. This is not limited in the embodiments of this application.

In this way, even though Sara receives another chat message from Mike between 12:08:12 and 12:08:56, because Sara enters the initial character "H" earlier, which indicates that Sara initiates the chat earlier, the mobile phone A still displays, according to the sending time 12:08:12, the first message 802 before the another chat message sent by Mike, to accurately reflect, in the first dialog area 603, an actual sequence of chat messages.

In some other embodiments of this application, as shown in FIG. 8(*a*), alternatively, the mobile phone A may synchronously display the first message 802 in the first dialog area 603 when Sara enters each character in the first message 802 into the first input box 602. In this case, content of the first message 802 in the first dialog area 603 changes with characters in the first input box 602. However, the first message 802 and another message in the first dialog area 603 are still arranged according to a sending time (or receiving time) sequence of the messages. In this way, a time sequence of initiating the chat by the users can be accurately reflected in the first dialog area 603. In addition, when a user enters a chat message, content of the chat message can be displayed in real time in the first dialog area 603, thereby improving use experience of the user during the chat.

S504. The mobile phone A sends the first message to the mobile phone B of the first contact, where a process in which the mobile phone A sends the first message is synchronous with a process in which the user enters the first message.

As shown in FIG. 8(*a*) and FIG. 8(*b*), when Sara enters each character in the first message 802 into the first input box 602, the mobile phone A may further synchronously send, based on an RTT technology, each character detected in the first input box 602 to the mobile phone B of the first contact Mike.

For example, after detecting that Sara enters the first text character (that is, the initial character "H") in the first message 802 into the first input box 602, the mobile phone A may send the initial character "H" to the mobile phone B of Mike. After receiving the initial character "H", the mobile phone B may record a receiving time (for example, 12:08:13) of the initial character "H".

When the mobile phone A receives an $N^{th}$ (N>1) text character entered by Sara into the first input box 602, the mobile phone A may sequentially send received text characters to the mobile phone B according to an input sequence.

When the mobile phone A receives a command character entered by Sara into the first input box 602, the mobile phone A may also send the command character to the mobile phone B. For example, if Sara enters a delete character into the first input box 602, the mobile phone A may synchronously send the delete character to the mobile phone B, so that the mobile phone B deletes a latest received character in response to the command character. For another example, if Sara enters, into the first input box 602, a preset character, for example, a feed line key (or a carriage return key), used to complete this message, the mobile phone A may also send the feed line character to the mobile phone B, so that the mobile phone B learns that the first message 802 sent by the mobile phone A this time is complete.

Subsequently, if the mobile phone B receives a new character sent by the mobile phone A, the mobile phone B may use the character as an initial character in a next received message, and re-execute the method in steps S505 to S507 to display the next received message.

S505. The mobile phone B displays the first message in the second dialog area in the second chat window.

The receiving time of the first message may be the receiving time at which the initial character in the first message is received by the mobile phone B, for example, the receiving time, 12:08:13, of the initial character "H". Alternatively, the receiving time of the first message may be the sending time at which the mobile phone A sends the initial character in the first message to the mobile phone B. Alternatively, the receiving time of the first message may be the input time at which the mobile phone A detects that the user enters the initial character in the first message, for example, the input time, 12:08:12, of the initial character "H". This is not limited in the embodiments of this application. When displaying the messages in the second dialog area, the messages are also sorted according to a sequence of a receiving time or a sending time of each message.

In some embodiments of this application, as shown in FIG. 8(*b*), when receiving each character in the first message 802 sent by the mobile phone A, the mobile phone B may synchronously display the first message 802 in the second dialog area 606 in the second chat window 604. That is, each time the mobile phone B receives a character, the mobile phone B may immediately display the character in the first message 802 in the second dialog area 606. In this way, content that is of the first message 802 and that is read by Mike from the second dialog area 606 also changes with a character entered by Sara into the first input box 602.

In addition, when displaying the received first message 802 in the second dialog area 606, the mobile phone B may use the receiving time (12:08:13) at which the mobile phone B receives the initial character "H" in the first message 802 as the receiving time of the first message 802, and displays the receiving time near the first message 802. In addition, a location of the first message 802 in the second dialog area 606 is also determined based on the receiving time of the first message 802. For example, if the mobile phone B receives a message before 12:08:13, the mobile phone B may display the first message 802 after the received message. Correspondingly, if the mobile phone B receives, after 12:08:13, a sent message that is entered by Mike to Sara, the mobile phone B may display the first message 802 before the sent message.

In this way, even though the mobile phone A has not sent the complete first message 802, the receiver Mike can already view, in real time, the first message 802 that is being sent by the sender Sara. In addition, because the receiving time of the initial character in the first message 802 can reflect a time point at which the sender Sara initiates the chat, after the receiving time of the initial character is used as the receiving time of the first message 802, an arrangement sequence of the first message 802 and another message in the second dialog area 606 can reflect an actual time sequence relationship in the chat process.

Figure 10:
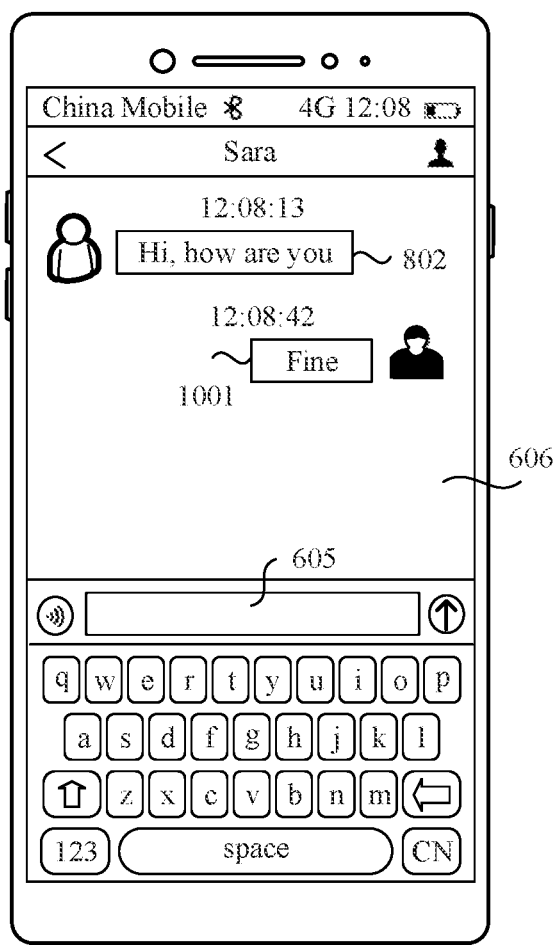
FIG. 10 is a schematic diagram 6 of a scenario of a message display method according to an embodiment of this application.

In some other embodiments of this application, as shown in FIG. 10, after receiving the feed line character sent by the mobile phone A, the mobile phone B may display, as the first message 802 in the second chat window 604, all characters (for example, "Hi, how are you") that are received this time.

When the first message 802 is displayed in the second chat window 604, the mobile phone B still uses the receiving time (12:08:13) of the initial character "H" in the first message 802 as the receiving time of the first message 802, and displays the receiving time in the second dialog area 606.

For example, although the time point at which the mobile phone B receives the line feed character "/n" after receiving "Hi, how are you" is 12:08:59, the mobile phone B displays the first message 802 "Hi, how are you" in the second dialog area 606 still based on the receiving time 12:08:13 of the initial character H, as shown in FIG. 10. In this way, even though the mobile phone B generates a new chat message between 12:08:13 and 12:08:59, for example, Mike sends a chat message 1001 at 12:08:42 in FIG. 10, because the mobile phone B receives the initial character "H" earlier, which indicates that Sara initiates the chat earlier, the mobile phone B still displays, according to the receiving time 12:08:13, the first message 802 before the chat message 1001 sent by Mike. Therefore, an actual chat sequence between chat messages is accurately reflected in the second chat window 604.

Figure 11:
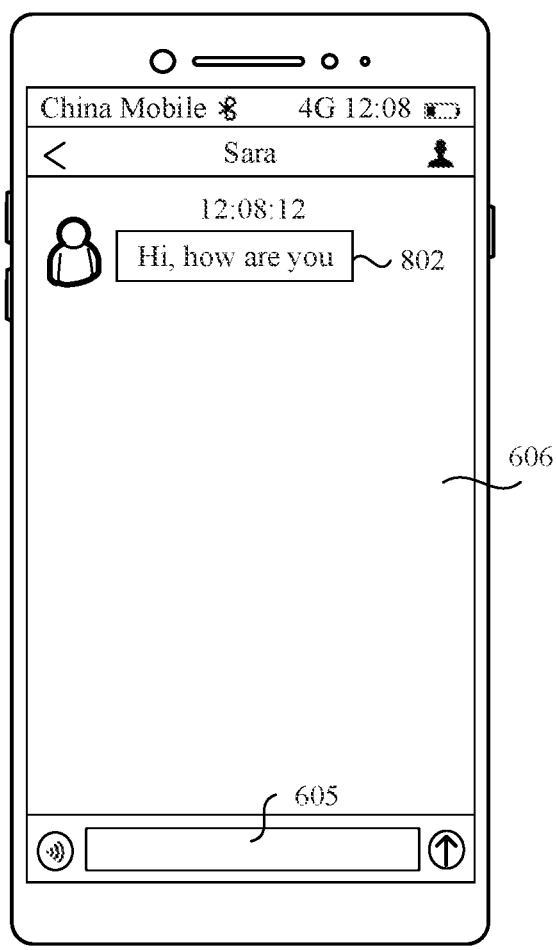
FIG. 11 is a schematic diagram 7 of a scenario of a message display method according to an embodiment of this application.

Alternatively, in some other embodiments of this application, the mobile phone A has recorded the input time (for example, 12:08:12) at which Sara enters the initial character "H" in the first message 802 into the first input box 602. Therefore, when sending the first message 802 to the mobile phone B, the mobile phone A may further send the input time of the initial character "H" to the mobile phone B. In this case, as shown in FIG. 11, the mobile phone B may use the input time of the initial character "H" as the receiving time of the first message 802, and arrange a display sequence of the first message 802 and another message in the second dialog area 606 based on the receiving time. In this way, the receiving time that is of the first message 802 that is viewed by Mike in the second dialog area 606 is the input time at which Sara starts to enter the initial character in the first message 802. This can prevent a time sequence between chat messages from becoming out of order due to a transmission delay.

S506. The mobile phone A receives a second message sent by the mobile phone B.

Similar to the foregoing process in steps S502 to S504 in which Sara enters, in the first chat window 601 displayed on the mobile phone A, the first message 802 that is sent to Mike, in step S506, Mike may also enter, in the second chat window 604 displayed on the mobile phone B, the second message sent to Sara.

Figure 12A:
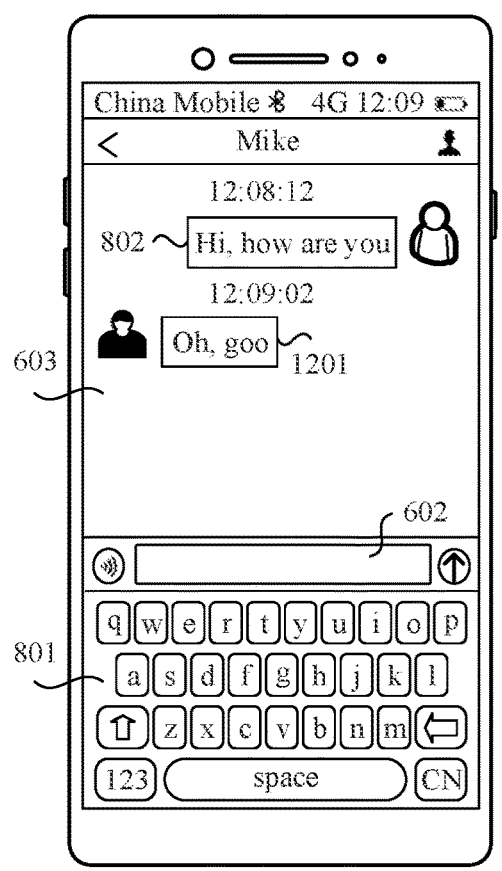
FIG. 12(a) and FIG. 12(b) are a schematic diagram 8 of a scenario of a message display method according to an embodiment of this application.
Figure 12B:
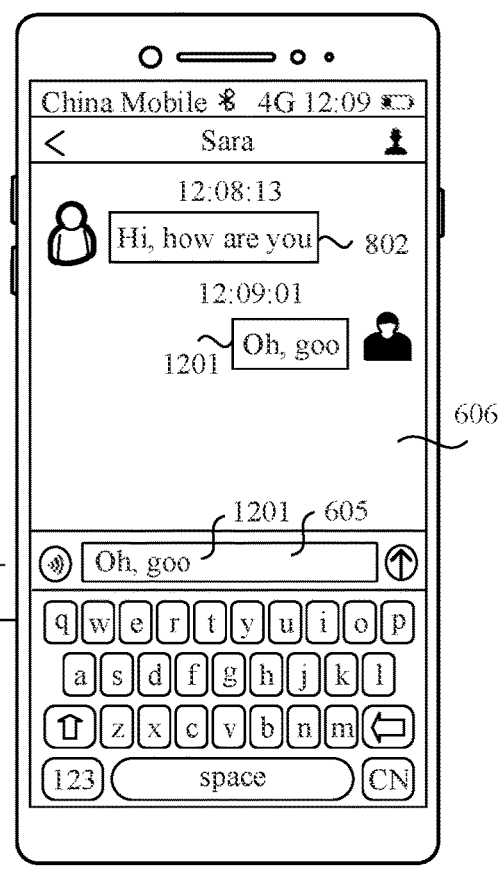

For example, as shown in FIG. 12(*b*), Mike may enter the second message 1201 into the second input box 605 by using the input method application. After detecting an initial character "O" in the second input box 605, the mobile phone B may record an input time (for example, 12:09:01) of the initial character "O", and use the input time of the initial character "O" as a sending time at which the mobile phone B sends the second message 1201. In this case, the mobile phone B may create a message box for the second message 1201 in the second dialog area 606 based on the sending time, and synchronously display, in the message box, the second message 1201 entered by Mike into the second input box 605.

In addition, the mobile phone B may synchronously send a character received in the second input box 605 to the mobile phone A of the receiver Sara, that is, send, to the mobile phone A, the second message 1201 entered by Mike. After receiving the initial character "O" in the second message 1201, the mobile phone A may also record a receiving time (for example, 12:09:02) of the initial character "O", and perform the following step S507.

S507. The mobile phone A displays the second message in the first chat window.

In some embodiments of this application, as shown in FIG. 12(a), for a method for displaying the second message 1201 in the first dialog area 603 by the mobile phone A, refer to related descriptions of displaying the first message 802 in the second dialog area 606 by the mobile phone B in step S505. In this case, a receiving time of the second message 1201 in the first dialog area 603 is the receiving time of the initial character "O", namely, 12:09:02.

Figure 13A:
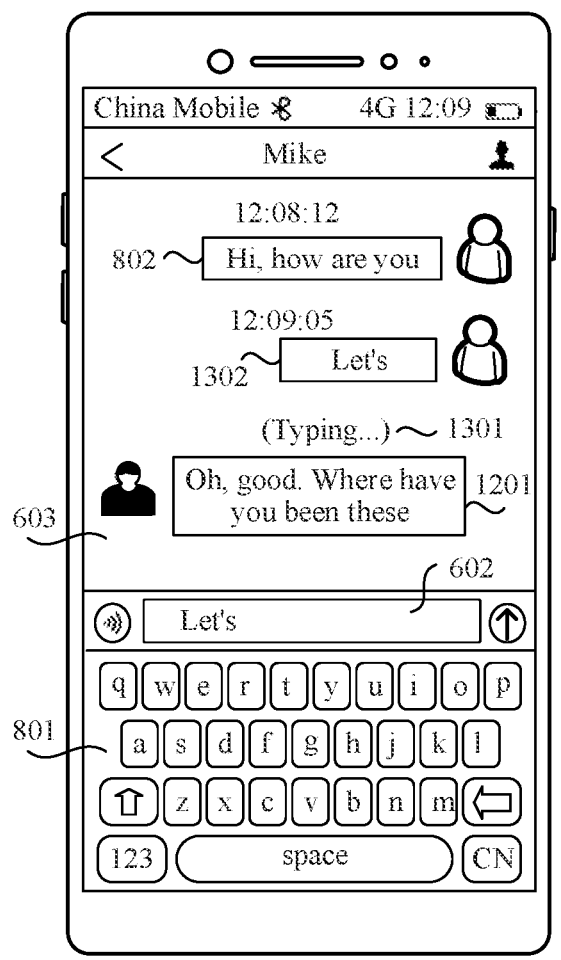
FIG. 13(a) and FIG. 13(b) are a schematic diagram 9 of a scenario of a message display method according to an embodiment of this application.

In some other embodiments of this application, as shown in FIG. 13(a), in a process in which the mobile phone A displays the second message 1201 in the first chat window 601, if the mobile phone A has not received a line feed character sent by the mobile phone B, it may be considered that the sender Mike of the second message 1201 is still entering content in the second message 1201. In this case, to ensure that the receiver Sara of the second message 1201 can read all content of the second message 1201, the mobile phone A may display, as a latest received message in the first dialog area 603 and after all messages, the second message 1201 that is being received.

Still as shown in FIG. 13(a), the mobile phone A may display, as the latest received message, the second message 1201 that is being received. In addition, the mobile phone A may further display a prompt 1301 near the second message 1201, to remind the user Sara that the second message 1201 sent by the other party is not complete. In this case, if the user Sara enters a new chat message 1302 into the first input box 602, although an input time of an initial character in the chat message 1302 is later than the receiving time of the initial character "O" in the second message 1201, because the second message 1201 is still in a receiving state, the mobile phone A may display the chat message 1302 before the second message 1201, so that Sara can read the second message 1201 that is being sent by Mike.

Figure 13B:
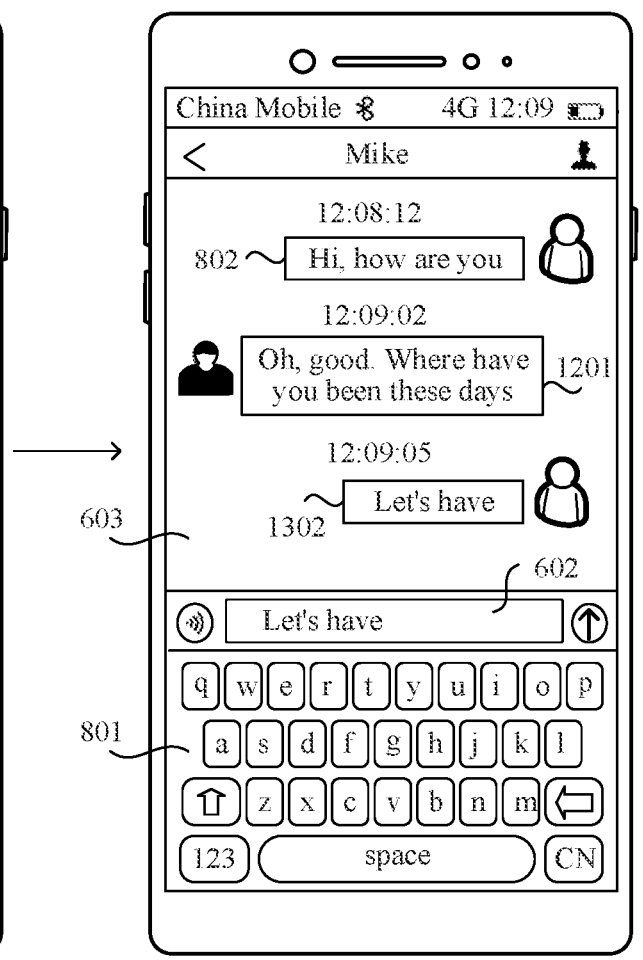

Subsequently, after the mobile phone A receives the line feed character sent by the mobile phone B, it may be considered that the second message 1201 sent by the mobile phone B this time is complete. As shown in FIG. 13(b), the mobile phone A may redetermine a display location of the second message 1201 in the first dialog area 603 according to the receiving time 12:09:02 of the initial character "O" in the second message 1201. In this case, because the receiving time of the initial character "O" in the second message 1201 is earlier than the input time of the initial character in the chat message 1302, the mobile phone A displays the second message 1201 before the chat message 1302, to restore an actual time sequence relationship between chat messages in the first dialog area 603.

Certainly, when the mobile phone A displays a chat message (for example, the first message 802) entered by Sara, if the mobile phone A does not detect the line feed character entered by Sara into the first input box 602, which indicates that input of the first message 802 is not completed, the mobile phone A may also use, as a latest chat message in the first dialog area 603, the first message 802 that is being entered, and display the latest chat message after all chat messages.

Alternatively, if the mobile phone A detects neither the line feed character sent by the mobile phone B nor the line feed character entered by Sara into the first input box 602, which indicates that both the first message 802 that is being entered by Sara and the second message 1201 sent by Mike are in an uncompleted state, the mobile phone A may display, after all chat messages, the first message 802 as a latest message in the first chat window 601, or may display, after all chat messages, the second message 1201 as a latest message in the first chat window 601. Alternatively, the mobile phone A may determine, according to a sequence of the receiving time of the initial character in the first message 802 and the receiving time of the initial character in the second message 1201, a chat message as the last chat message and display the chat message behind all chat messages. This is not limited in the embodiments of this application.

Figure 14:
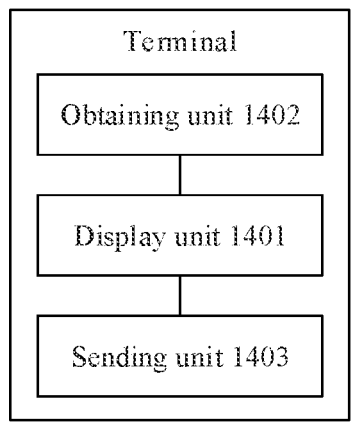
FIG. 14 is a schematic structural diagram 2 of a terminal according to an embodiment of this application.

In some embodiments of this application, an embodiment of this application discloses a terminal. As shown in FIG. 14, the terminal is configured to implement the method recorded in the foregoing method embodiments, and the terminal includes a display unit 1401, an obtaining unit 1402, and a sending unit 1403. The display unit 1401 is configured to support the terminal in performing the processes S501, S503, and S507 in FIG. 5. The obtaining unit 1402 supports the terminal in performing the processes S502 and S506 in FIG. 5. The sending unit 1403 is configured to support the terminal in performing the process S504 in FIG. 5. All related content of the steps in the foregoing method embodiments may be cited in function descriptions of corresponding function modules. Details are not described herein again.

Figure 15:
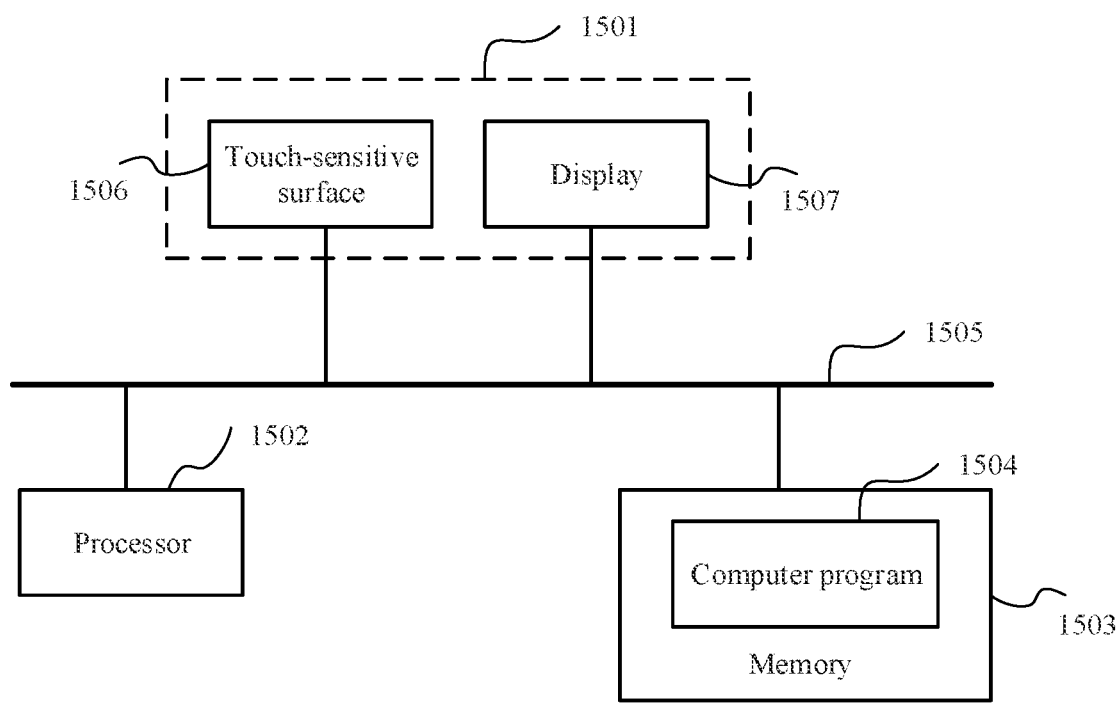
FIG. 15 is a schematic structural diagram 3 of a terminal according to an embodiment of this application.

In some other embodiments of this application, an embodiment of this application discloses a terminal. As shown in FIG. 15, the terminal may include a touchscreen 1501, where the touchscreen 1501 includes a touch-sensitive surface 1506 and a display 1507, one or more processors 1502, a memory 1503, one or more applications (not shown), and one or more computer programs 1504. The foregoing components may be connected by using one or more communications buses 1505. The one or more computer programs 1504 are stored in the memory 1503 and are executed by the one or more processors 1502. The one or more computer programs 1504 include an instruction, and the instruction may be used to perform the steps in FIG. 5 and the corresponding embodiments.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A message display method implemented by a first terminal, wherein the message display method comprises:
   displaying a chat window comprising an input box and a dialog area for chatting with a second terminal;
   receiving, at a first moment, a first initial character of a first message from a user into the input box, wherein the first message comprises X characters, and wherein X is an integer greater than zero;
   sending, to the second terminal in real time from the first moment, a character received from the user into the input box;
   receiving, at a second moment, a second initial character of a second message from the second terminal, wherein the second moment is later than the first moment, wherein the second message comprises Y characters, and wherein Y is an integer greater than zero;
   receiving, at a third moment, a first preset character from the user into the input box, wherein the first preset character indicates that the first message is complete, and wherein the third moment is later than the second moment; and
   displaying the first message and the second message in the dialog area,
   wherein the first message is displayed as a message earlier than the second message.

2. The message display method of claim 1, wherein a sending time of the first message is the first moment, and wherein a receiving time of the second message is the second moment or the first moment.

3. The message display method of claim 2, further comprising displaying the sending time and the receiving time in the dialog area.

4. The message display method of claim 1, further comprising:
   receiving, between the first moment and the third moment, X-1 characters that are other than the first initial character in the first message from the user into the input box; and
   synchronously displaying, each time one of the X characters is displayed in the input box, the one of the X characters in a first message box in the dialog area.

5. The message display method of claim 1, wherein after receiving the first preset character, the message display method further comprises clearing all characters in the input box.

6. The message display method of claim 1, wherein after receiving the second initial character, the message display method further comprises receiving, at a fourth moment, a second preset character from the second terminal, and wherein the second preset character indicates that the second message is complete.

7. The message display method of claim 6, further comprising:
   receiving, between the second moment and the fourth moment, Y-1 characters that are other than the second initial character in the second message from the second terminal; and
   synchronously displaying, each time the first terminal receives one of the Y characters, the one of the Y characters in a second message box in the dialog area.

8. The message display method of claim 6, further comprising:
   displaying the second message as a latest message in the dialog area between the second moment and the fourth moment; and
   displaying a prompt indicating that the second message is being entered.

9. The message display method of claim 8, further comprising:
   receiving, between the second moment and the fourth moment, a third initial character of a third message from the user into the input box, wherein the third message comprises Z characters, and wherein Z is an integer greater than zero; and
   displaying, in the dialog area, the third message as another message earlier than the second message.

10. The message display method of claim 9, wherein after receiving the second preset character, the message display method further comprises updating displayed information in the dialog area to display the third message as a message later than the second message.

11. A message display method implemented by a first terminal, wherein the message display method comprises:
    displaying a chat window comprising a dialog area for chatting with a second terminal;
    receiving, at a first moment, a first initial character of a first message from the second terminal, wherein the first message comprises Y characters, wherein Y is an integer greater than zero, wherein the first message is a latest message in the dialog area, and wherein a receiving time of the first message is the first moment;
    receiving Y-1 characters that are other than the first initial character in the first message from the second terminal; and
    synchronously displaying, each time the first terminal receives one of the Y characters, the one of the Y characters in a first message box in the dialog area.

12. The message display method of claim 11, wherein after receiving the Y-1 characters, the message display method further comprises receiving, at a second moment, a preset character indicating that the first message is complete from the second terminal, and wherein the second moment is later than the first moment.

13. The message display method of claim 12, further comprising:
    receiving, between the first moment and the second moment, a second initial character of a second message from a user, wherein the second message comprises X characters, and wherein X is an integer greater than zero; and
    displaying, in the dialog area, the second message as a message earlier than the first message.

14. The message display method of claim 13, wherein after receiving the preset character, the message display method further comprises updating displayed information in the dialog area to display the first message as a message earlier than the second message.

15. A first terminal comprising:
a memory configured to store instructions; and
a processor coupled to the memory, wherein the instructions cause the processor to be configured to:
display a chat window comprising an input box and a dialog area for chatting with a second terminal;
receive, at a first moment, a first initial character of a first message from a user into the input box, wherein the first message comprises X characters, and wherein X is an integer greater than zero;
send, to the second terminal in real time from the first moment, a character received from the user into the input box;
receive, at a second moment, a second initial character of a second message from the second terminal, wherein the second moment is later than the first moment, wherein the second message comprises Y characters, and wherein Y is an integer greater than zero;
receive, at a third moment, a first preset character from the user into the input box, wherein the first preset character indicates that the first message is complete, and wherein the third moment is later than the second moment; and
display the first message and the second message in the dialog area,
wherein the first message is displayed as a message earlier than the second message.

16. The first terminal of claim 15, wherein the instructions further cause the processor to be configured to:
receive, between the first moment and the third moment, X-1 characters that are other than the first initial character in the first message from the user into the input box; and
synchronously display, each time one of the X characters is displayed in the input box, the one of the X characters in a first message box in the dialog area.

17. The first terminal of claim 15, wherein the instructions further cause the processor to be configured to clear all characters in the input box at the third moment.

18. The first terminal of claim 15, wherein the instructions further cause the processor to be configured to receive, at a fourth moment, a second preset character from the second terminal, and wherein the second preset character indicates that the second message is complete.

19. The first terminal of claim 18, wherein the instructions further cause the processor to be configured to:
receive, between the second moment and the fourth moment, Y-1 characters that are other than the second initial character in the second message from the second terminal; and
synchronously display, each time the first terminal receives one of the Y characters, the one of the Y characters in a second message box in the dialog area.

20. The first terminal of claim 18, wherein the instructions further cause the processor to be configured to:
display the second message as a latest message in the dialog area between the second moment and the fourth moment; and
display a prompt indicating that the second message is being entered.

* * * * *